United States Patent
Atkinson et al.

(10) Patent No.: US 6,381,239 B1
(45) Date of Patent: Apr. 30, 2002

(54) MULTIPLE APPLICATION SWITCHING PLATFORM AND METHOD

(75) Inventors: Roger F. Atkinson, El Cajon; Simon S. Ng, Cupertino; Robert J. Siefert, Escondido; William Ashley, Oceanside; Kenneth A. Beckman, La Mesa; Raymond Klein, Ramona, all of CA (US)

(73) Assignee: Taqua Systems, Inc., Centerville, MA (US)

( * ) Notice: Subject to any disclaimer, the term of this patent is extended or adjusted under 35 U.S.C. 154(b) by 0 days.

(21) Appl. No.: 09/125,217

(22) PCT Filed: Feb. 13, 1997

(86) PCT No.: PCT/US97/01560

§ 371 Date: Aug. 13, 1998

§ 102(e) Date: Aug. 13, 1998

(87) PCT Pub. No.: WO97/30555

PCT Pub. Date: Aug. 21, 1997

Related U.S. Application Data

(60) Provisional application No. 60/011,570, filed on Feb. 13, 1996.

(51) Int. Cl.[7] .............................................. H04Q 11/04
(52) U.S. Cl. ...................................................... 370/362
(58) Field of Search ................................ 370/362, 342, 370/347, 341, 442, 389, 465, 466, 351, 352, 401, 402, 403, 350, 503, 216, 318, 363, 367, 368, 357, 321, 345, 468, 295; 379/93.05, 93.07, 93.09, 93.08

(56) References Cited

U.S. PATENT DOCUMENTS

| | | |
|---|---|---|
| 2,747,019 A | 5/1956 | Chubb et al. |
| 2,747,021 A | 5/1956 | Chubb et al. |
| 3,806,660 A | 4/1974 | Gueldenpfennig et al. |
| 3,806,661 A | 4/1974 | Gueldenpfennig et al. |
| 3,825,692 A | 7/1974 | Gueldenpfennig et al. |
| 3,842,215 A | 10/1974 | Russell et al. |
| 3,859,474 A | 1/1975 | Gueldenpfennig |
| 3,885,104 A | 5/1975 | Smith et al. |
| 3,903,373 A | 9/1975 | Gueldenpfennig et al. |
| 3,963,875 A | 6/1976 | Gueldenpfennig et al. |
| 4,166,199 A | 8/1979 | Gueldenpfennig et al. |
| 4,228,536 A | 10/1980 | Gueldenpfennig et al. |
| 4,352,180 A | 9/1982 | Schulze |
| 4,455,646 A | 6/1984 | Bloodworth |
| 4,521,879 A | 6/1985 | Gueldenpfennig et al. |
| 4,530,092 A | 7/1985 | Hafer |
| 4,566,094 A | 1/1986 | Ardon et al. |
| 4,685,104 A | 8/1987 | Johnson et al. |
| 4,686,669 A | 8/1987 | Chang |
| 4,747,130 A | 5/1988 | Ho |
| 4,852,089 A | 7/1989 | Berry et al. |
| 4,866,708 A | 9/1989 | Ardon et al. |
| 5,040,172 A | 8/1991 | Mano et al. |

(List continued on next page.)

Primary Examiner—Dang Ton

(57) ABSTRACT

A multiple application switching platform includes a switch having a distributed open architecture and incorporating redundancy for enhanced fault tolerance. The switch includes at least one shelf having a midplane (1) containing message buses and TDM data buses (A and B). Shelves may be interconnected to form a group wherein various circuit cards are connected to each shelf midplane. The circuit cards (4, 5 and 6) perform call processing wherein each card within a group accessing a data bus is pre-assigned a unique set of time slots for each data bus within which that card may transmit onto that data bus. Each circuit card further includes an identification number that enables each card an opportunity to transmit onto a message bus (A and B). The circuit cards (4, 5 and 6) include line or trunk switch cards that function as an independent switch to interface line or trunks to a shelf midplane. Communications between lines or trunks connected to any group shelf is facilitated by switch cards communicating with each other via messages sent over the message buses (A and B).

48 Claims, 8 Drawing Sheets

U.S. PATENT DOCUMENTS

| | | |
|---|---|---|
| 5,151,896 A | 9/1992 | Bowman et al. |
| 5,175,866 A | 12/1992 | Childress et al. |
| 5,239,542 A | 8/1993 | Breidenstein et al. |
| 5,253,253 A | 10/1993 | Brame et al. |
| 5,257,260 A | 10/1993 | Breidenstein et al. |
| 5,274,838 A | 12/1993 | Childress et al. |
| 5,276,678 A | 1/1994 | Hendrickson et al. |
| 5,315,589 A | 5/1994 | Kepley et al. |
| 5,321,744 A | 6/1994 | Madonna et al. |
| 5,329,524 A | 7/1994 | Paker et al. |
| 5,349,579 A | 9/1994 | Madonna et al. |
| 5,365,512 A | 11/1994 | Combs et al. |
| 5,365,590 A | 1/1995 | Gulliford et al. |
| 5,392,278 A | 2/1995 | Teel et al. |
| 5,398,161 A | 3/1995 | Roy |
| 5,423,003 A | 6/1995 | Berteau |
| 5,426,634 A | 6/1995 | Cote et al. |
| 5,426,694 A | 6/1995 | Hebert |
| 5,442,634 A | 8/1995 | Cizek |
| 5,544,163 A | 8/1996 | Madonna |
| 5,546,453 A | 8/1996 | Hebert |
| 5,596,569 A | 1/1997 | Madonna et al. |
| 5,598,409 A | 1/1997 | Madonna et al. |
| 5,602,991 A | 2/1997 | Berteau |
| 5,726,984 A * | 3/1998 | Kubles et al. ............... 370/338 |
| 6,195,697 B1 * | 2/2001 | Boxman-Amuah ......... 370/252 |

* cited by examiner

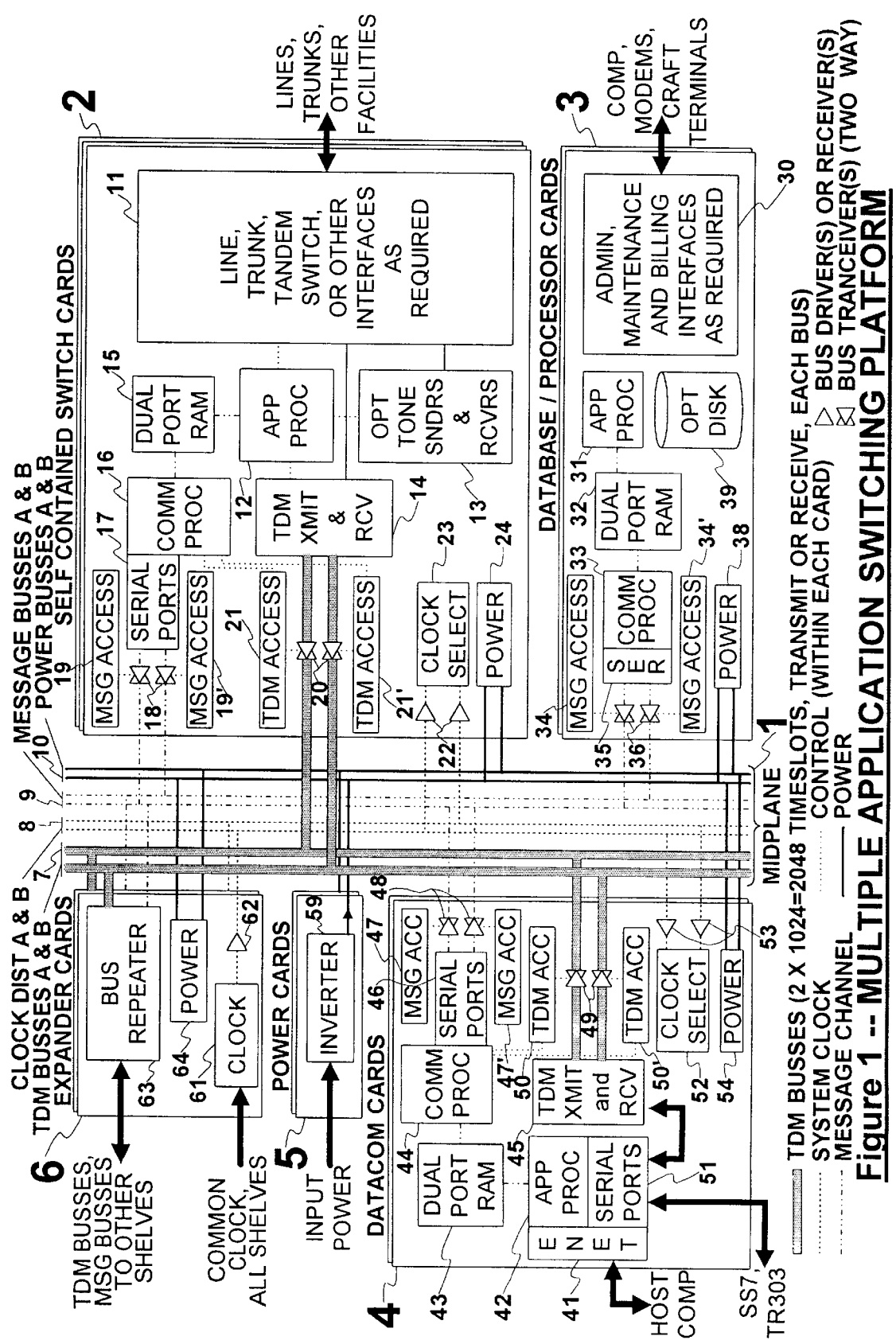
Figure 1 -- MULTIPLE APPLICATION SWITCHING PLATFORM

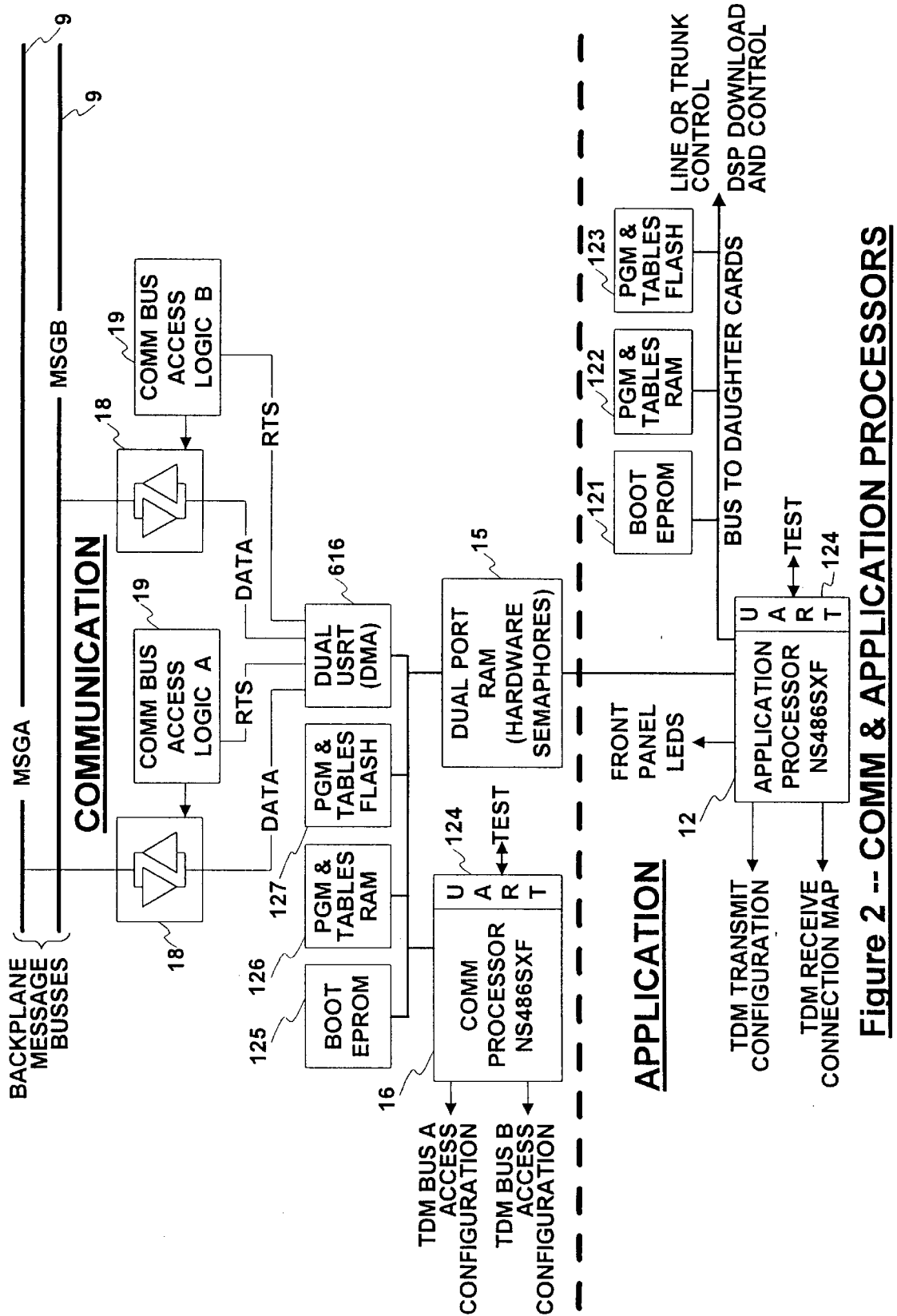
Figure 2 -- COMM & APPLICATION PROCESSORS

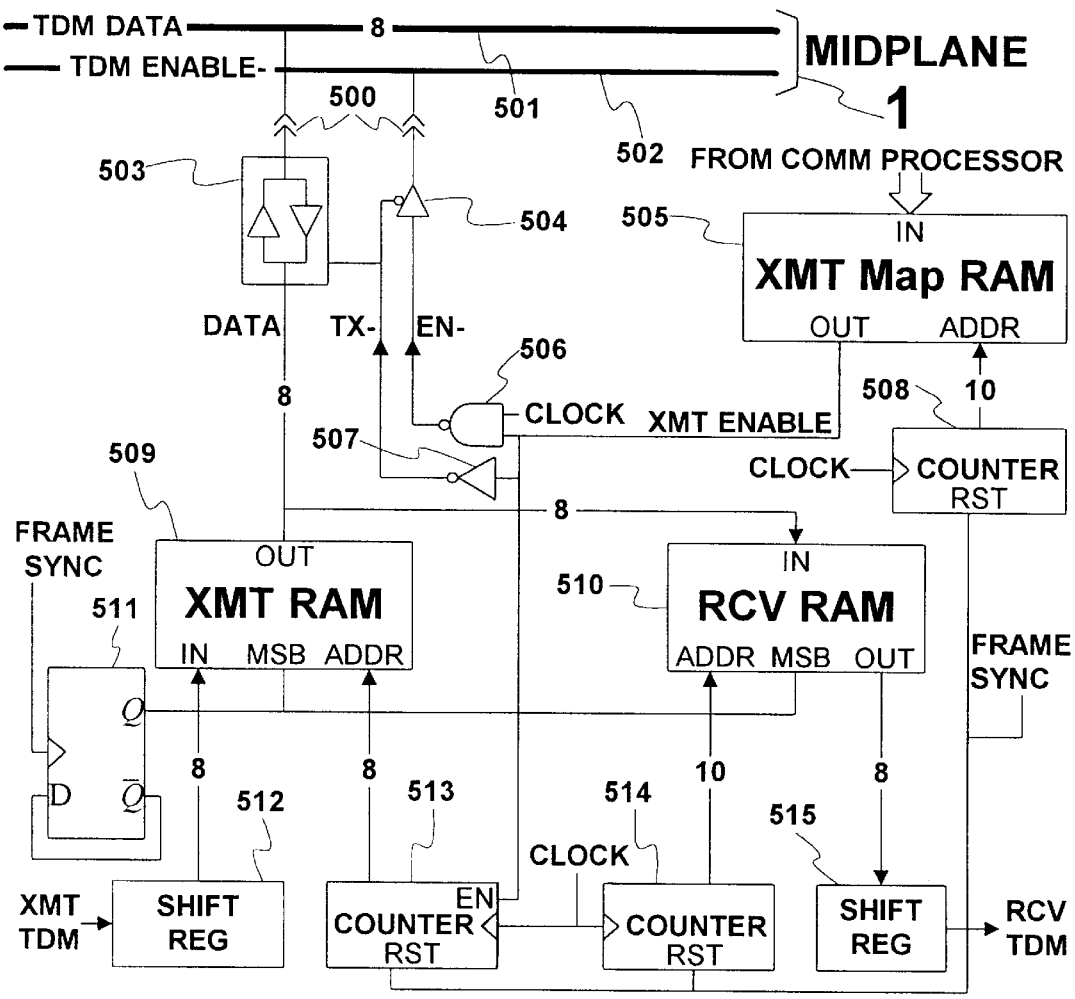
Figure 3a -- TDM ACCESS
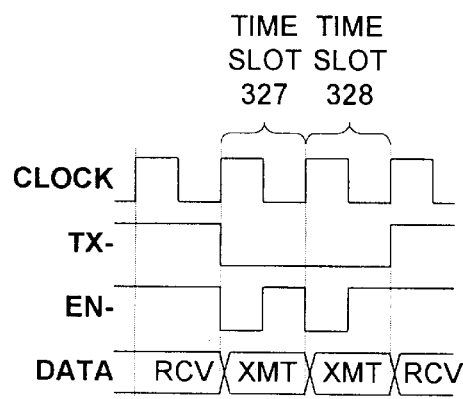
Figure 3b -- TDM TIMING

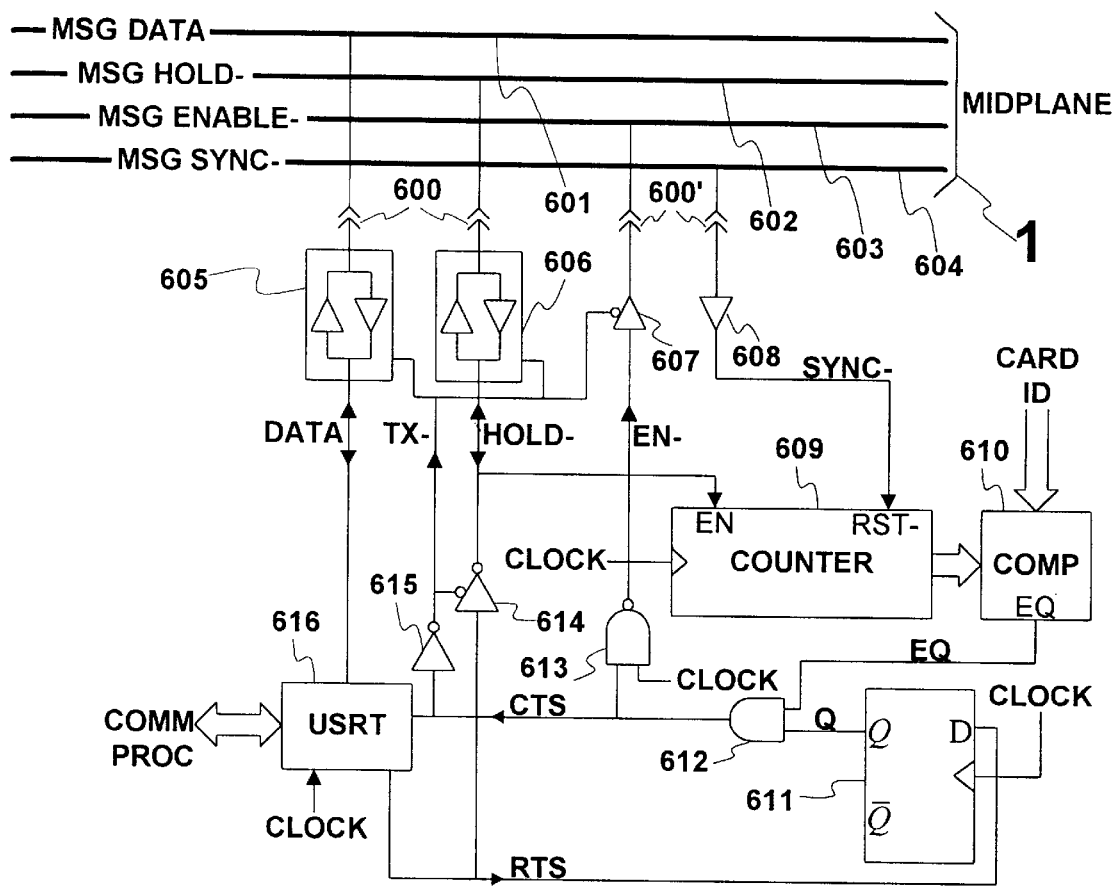
Figure 4a -- MESSAGE ACCESS
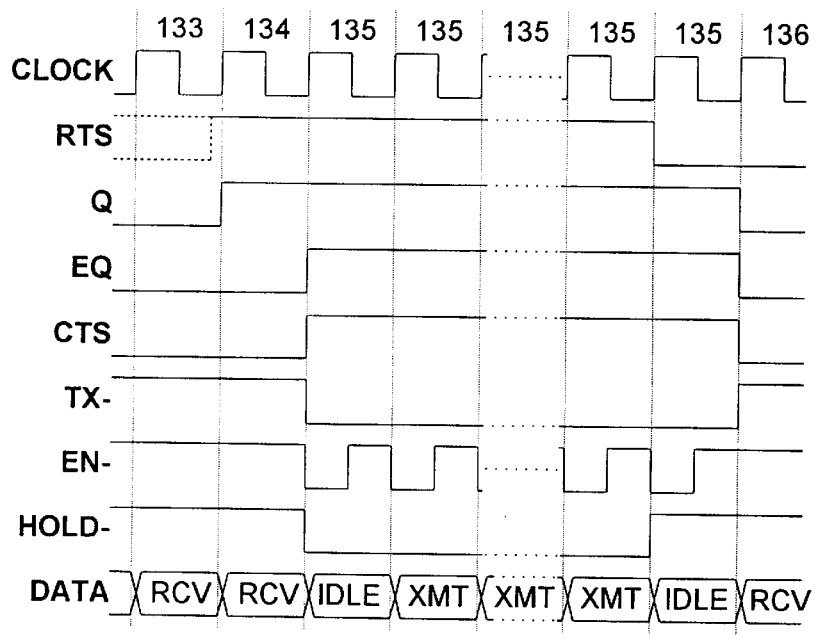
Figure 4b -- MESSAGE TIMING

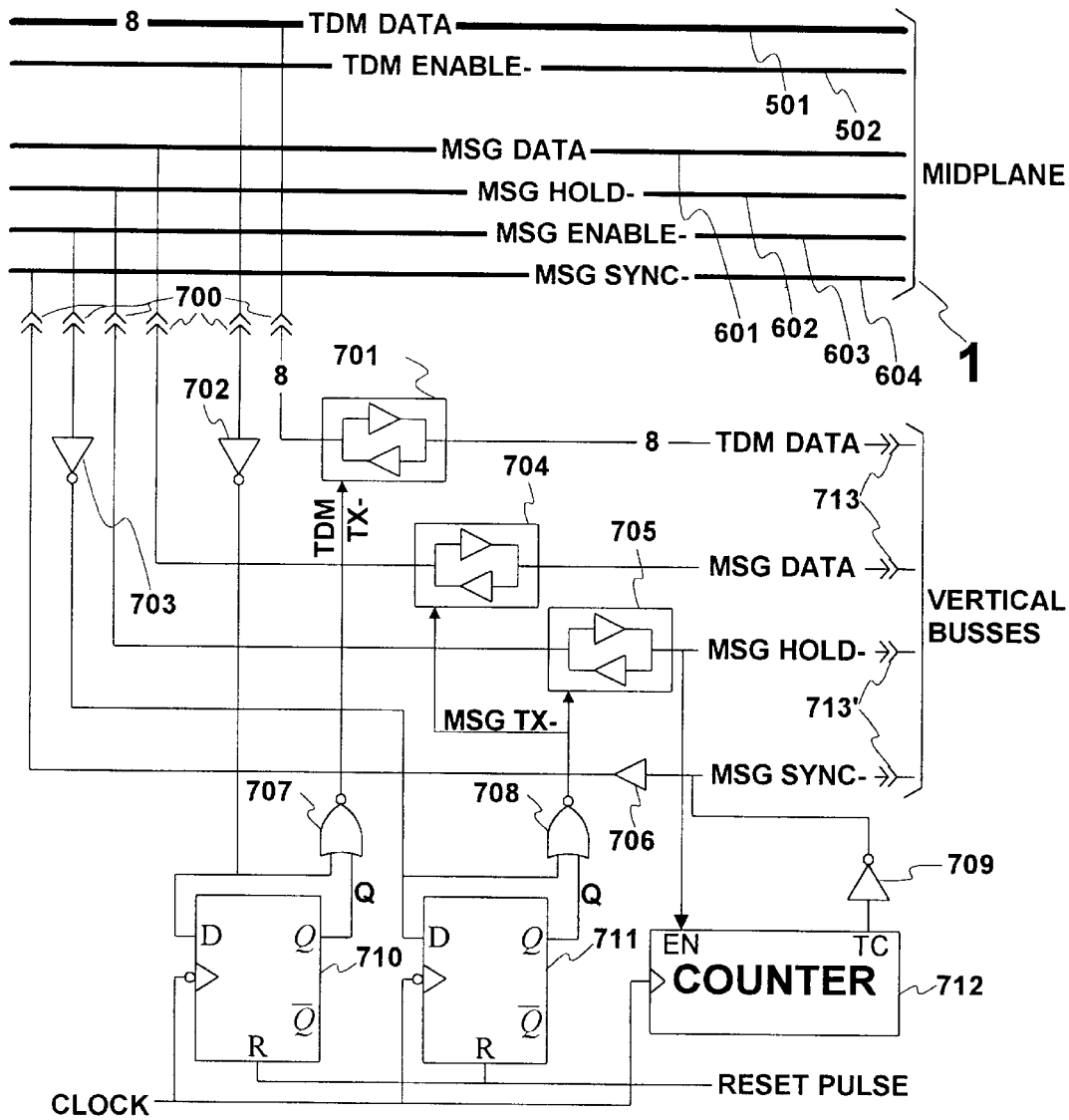
Figure 5a -- BUS REPEATER
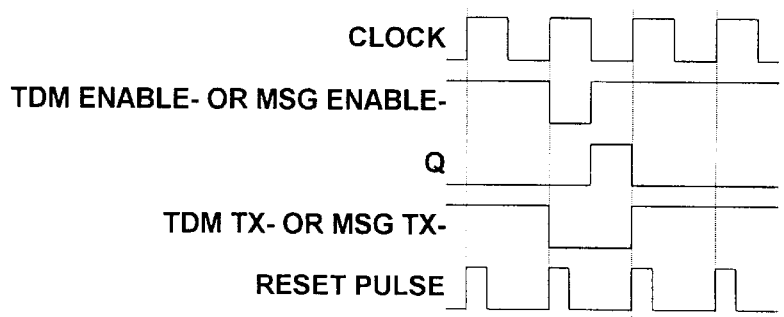
Figure 5b -- BUS REPEATER TIMING

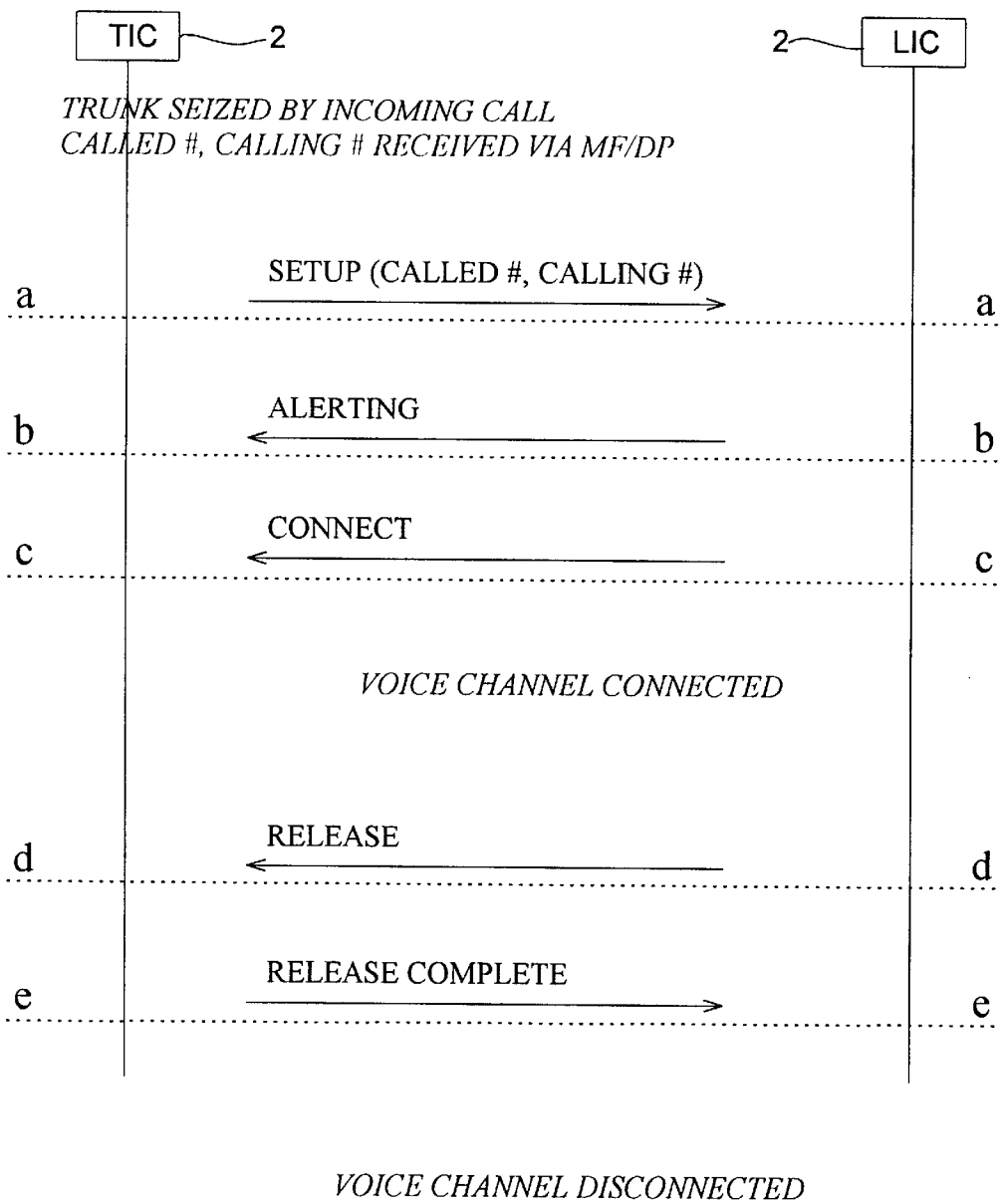
Figure 6 -- TRUNK TO STATION CALL

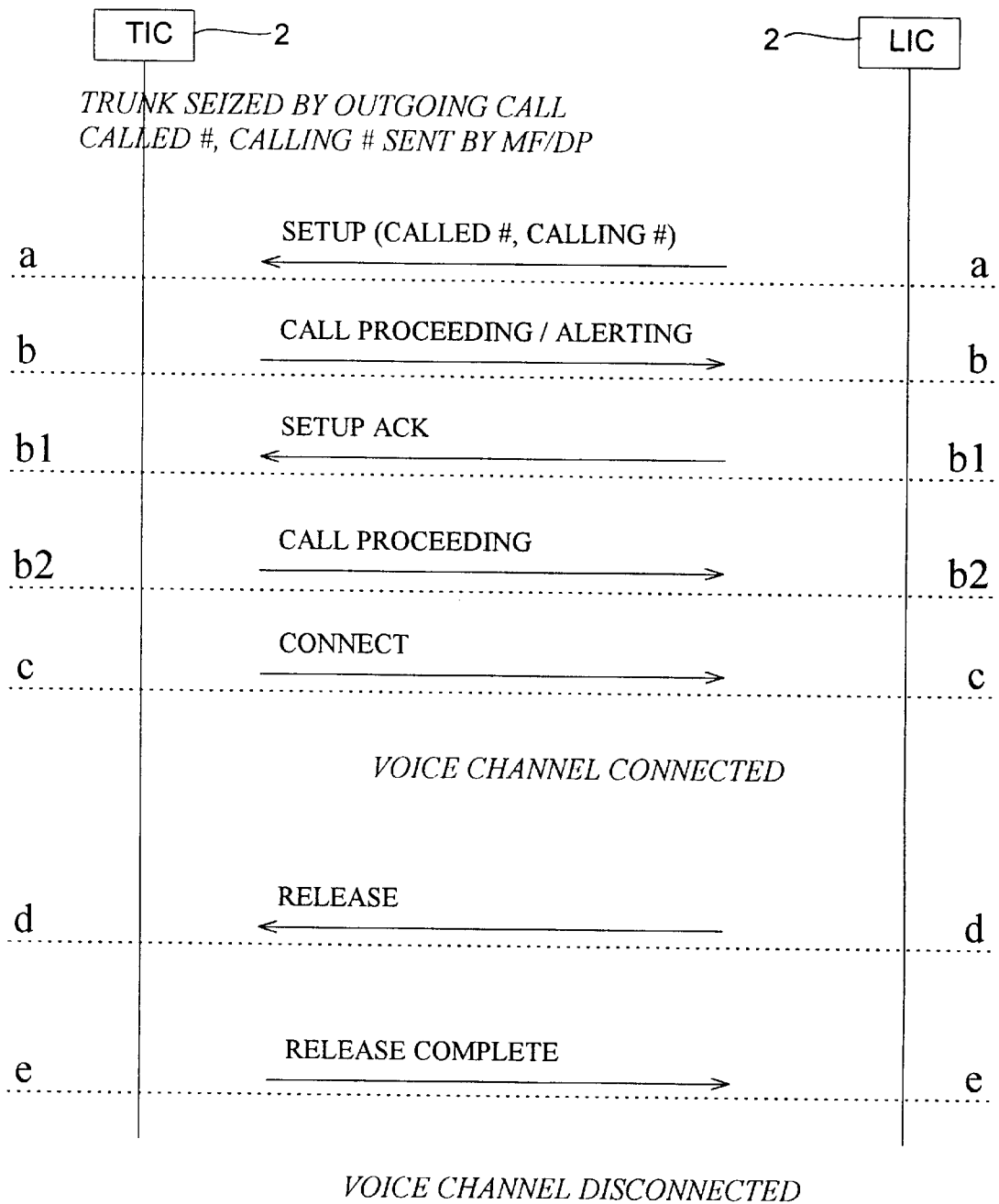
Figure 7 -- NETWORK CALL FROM STATION

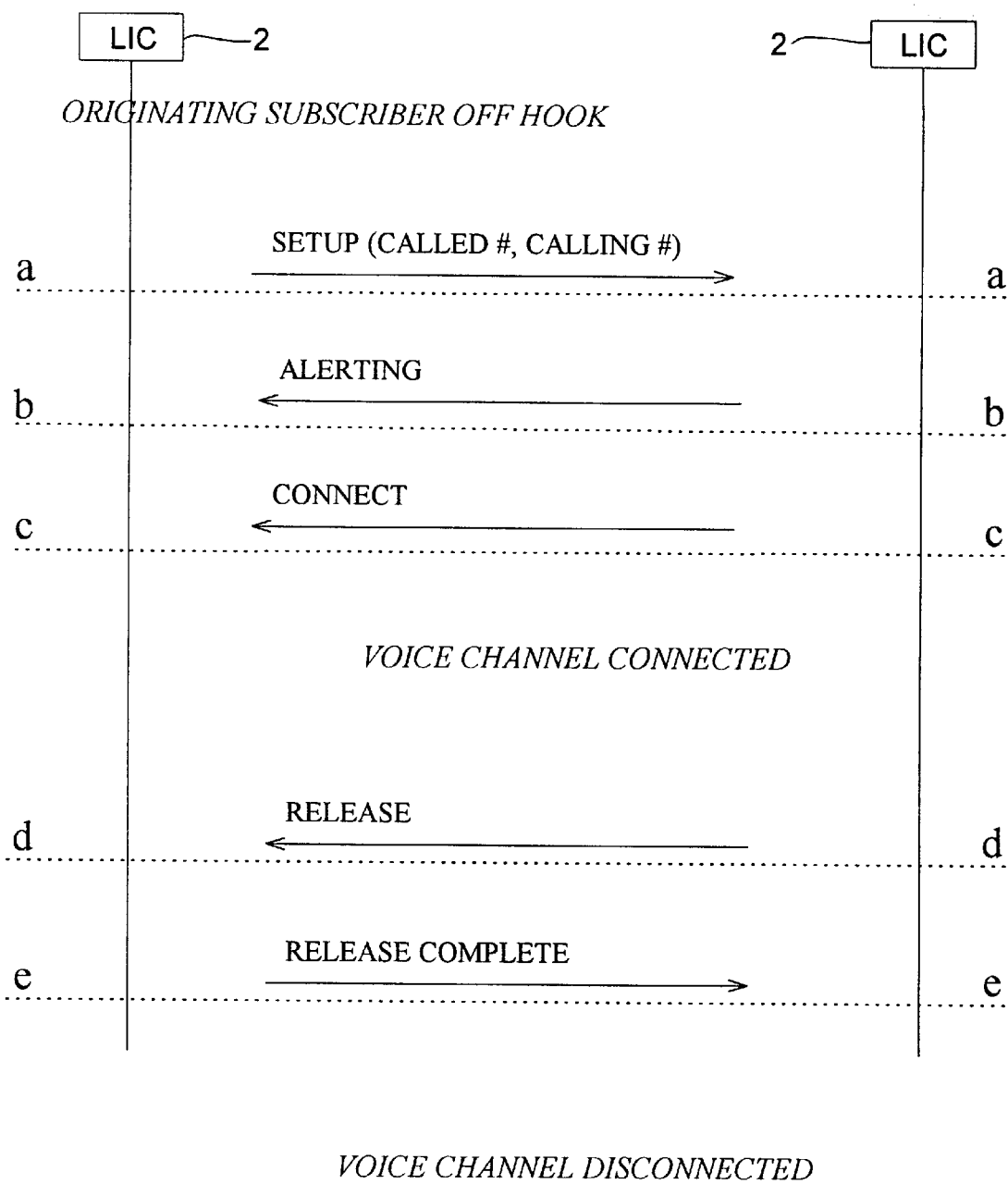
Figure 8 -- STATION TO STATION CALL

MULTIPLE APPLICATION SWITCHING PLATFORM AND METHOD

CROSS-REFERENCE TO RELATED APPLICATIONS

This application claims priority from U.S. provisional patent application Ser. No. 60/011,570, filed Feb. 13, 1996 entitled "Multiple Application Switching Platform".

BACKGROUND OF THE INVENTION

1. Technical Field

The present invention pertains to a communications switch preferably for use in telephone switching systems. In particular, the present invention pertains to a distributed architecture telephone switching platform that processes telephone call requests by establishing connections between a communication source and a communication destination without the use of a centralized processor, centralized resources or a centralized switching matrix.

2. Discussion of Prior Art

Generally, modem switching systems (e.g., of the kind employed within central offices and/or private or private automatic branch exchanges) include a time division multiplexed (TDM) bus as a common medium to transport information (e.g., voice or data signals) between multiple sources and destinations on a time-shared basis. Information is typically transported over the time division multiplexed (TDM) bus in units commonly referred to as frames wherein each frame typically includes at least thirty-two time slots within a 125 microsecond frame period. Thus, the bus accommodates 8,000 frames during each one second interval. A connection between a communication source and a communication destination is typically accomplished by notifying the communication source and communication destination of the particular time slot the other is utilizing for transmission of data over the time division multiplexed (TDM) bus. The communication source transmits data during its designated time slot period and examines information received during the time slot utilized by the communication destination in order to retrieve information from the communication destination. Similarly, the communication destination transmits data during its designated time slot period and examines information received during the time slot utilized by the communication source to retrieve information from the communication source. The designated time slots, in effect, provide a connection between the communication source and communication destination and further enable multiple connections, via the different time slots within a frame, for facilitating communications between multiple communication sources and communication destinations. Larger systems frequently use several such buses, each providing a connection between one or a few sources and destinations, and a central time slot interchange unit (i.e., matrix) which makes connections between sources and destinations attached to different buses.

In order to establish a connection between a communication source and communication destination (e.g., processing a telephone call), switching systems frequently utilize a systemwide common database containing information relating to time slot availability (i.e., time slots that are currently available for establishing connections). The database is typically consulted by the communication source and communication destination to ascertain available time slots during which the communication source and communication destination may transmit information across the time division multiplexed (TDM) bus. The database is maintained in real time and may reside within two independent processors when redundant processors are utilized to enhance system fault tolerance. When a time slot is utilized to establish a connection, or when a time slot becomes available subsequent to termination of a connection, the database is updated to reflect the current availability status of the respective time slots. The manner in which connections are facilitated between any communication source and communication destination via a switching system is fairly sophisticated since each communication source potentially requires a connection to each communication destination. A central switching matrix is commonly employed to establish these connections wherein a redundant or spare matrix is frequently employed to automatically replace the original matrix in response to an original matrix failure. Further, several switching systems include common resources and/or utilize a common or central processor to perform substantially all of the connection activity and control for the switching system.

Switches having common or central resources suffer from several disadvantages. Specifically, common processors tend to create bottlenecks, thereby restricting processor throughput and switch efficiency. System enhancement to a common processor switching system via addition of hardware and/or software tends to be difficult due to numerous time critical concurrent processes typically executing within the common processor. Further, a central processor performs several tasks, typically in a multi-tasking environment, thereby complicating programming, debugging and portability of tasks, increasing the chance of real time problems and reducing the processing power for each task. Moreover, a spare or redundant processor is commonly utilized in a central processor switching system since failure of the common processor tends to disable the switching system. The spare processor usually requires real time updates, to coincide with the central processor thereby reducing the central processor throughput.

Common matrices employed within switching systems typically require real time connection maps to indicate the status of matrix connections wherein the connection maps are constantly maintained and updated to accurately reflect the matrix connection state. The maintenance of connection maps is usually performed by a processor, thereby distracting the processor from handling connection requests and reducing switch efficiency. Further, since the size of a centralized matrix increases in relation to an increase in communication sources, expansion of the switch becomes expensive and may exceed cost efficiency. Moreover, since failure of a matrix essentially disables switch operation, an additional redundant matrix is often utilized to automatically replace the original matrix in response to an original matrix failure, thereby substantially increasing the costs and complexity of a switching system. In addition, centralized matrices commonly have a particular quantity of matrix ports (i.e., time slots) physically connected or permanently assigned to a slot or a group of slots within a backplane, thereby restricting the quantity of ports that may be utilized by a source or communication destination connected to the switch through that backplane slot. The matrix port assignment may prevent calls from immediately being processed (i.e., increase blocking) when an insufficient quantity of ports have been assigned to a particular backplane slot (i.e., the quantity of possible simultaneous calls to or from lines or trunks connected to that backplane slot exceeds the quantity of assigned ports). Conversely, the matrix port assignment may waste resources when the quantity of ports assigned to a particular backplane slot exceeds requirements of that backplane slot (i.e., the quantity of assigned matrix ports exceeds the quantity of possible calls from attached lines or trunks, thereby having idle ports that are unavailable to process calls received on other backplane slots).

Generally, switching systems employing common resources for control and/or matrix switching have limited growth potential since the maximum capacity of the central resources governs the switch growth capacity. These systems are typically replaced with larger switching systems to attain increased switching capacity. Further, common resources tend to be expensive, thereby compromising switching system growth potential in favor of lower start-up costs for a small installation. Thus, a common resource switching system may either far exceed switching requirements for an installation (i.e., having more capacity than required), or be insufficient to handle increased switching requirements within a short-term, thereby necessitating replacement by a larger switching system. Moreover, incorporating fault tolerance into a switching system, via redundancy, by duplicating the common resources dramatically increases system costs and requires the system to transfer responsibilities from a failing original resource to a spare resource. This task of incorporating fault tolerance into the switch is extremely arduous with respect to hardware, and becomes even more difficult in relation to software. In addition, existing small switches lack redundancy and do not and can not be modified to comply with Bellcore LSSGR (i.e., Local Access and Transport Area (LATA) Switching Systems Generic Requirements, a standard set of switching requirements).

Prior art systems obviate some of the above described disadvantages by employing a distributed control approach wherein switching tasks performed by a switching system common processor are delegated to several processors or other devices each operating in parallel. The utilization of parallel processing increases processing power and speed for each task since each processor or device is concurrently performing a task as opposed to a single processor executing several tasks. For example, Bloodworth (U.S. Pat. No. 4,455,646) discloses a pulse code modulated digital automatic exchange wherein the exchange includes an input/output system and a data transfer system. The input/output system is connected to a plurality of input/output ports and stores data from these ports in a data store at a location associated with the originating port. The transfer system transfers data from the input store, during a time slot corresponding to a particular port, wherein the input time slots of the respective origination and destination ports become the output time slots for the corresponding other port (i.e., the input time slot for the origination port is the output time slot for the destination port, while the input time slot for the destination port is the output time slot for the originating port).

Bowman et al (U.S. Pat. No. 5,151,896) disclose a distributed digital telephone system wherein switching functions are accomplished by a plurality of switching nodes connected to a link module that establishes interconnections between switching nodes via dynamically assigned time slots on a time division multiplexed (TDM) highway. The system may employ additional highways for fault tolerance and includes a plurality of integrated circuit cards each having a unique identifier based on the position of that card within a backplane of a card cage. The unique identifiers enable resource status information to be broadcasted throughout the system.

Gueldenpfennig et al (U.S. Pat. No. 4,228,536) disclose a distributed time division digital communication system providing two-way communication between a plurality of lines. The system includes a plurality of switching units wherein each switching unit includes ports for interfacing the lines to receive and send digital signals, service circuits (e.g., tone generators, tone signaling senders and receivers, etc.), a time slot interchange and a processor. Switching units communicate via control lines, while send highways enable ports to send and receive data from other switching unit ports. The time slot interchanges include memory locations for send highways of the switching units, wherein digital signals from the send highways are written in corresponding memory locations. Communication is established by selectively receiving data from the send highways during a time slot allocated to a particular port wherein time slot assignment occurs at system initialization and is based upon board position signals residing on lines disposed on a backplane containing the port and service circuits.

Cheng (U.S. Pat. No. 4,686,669) discloses a distributed control switching system wherein a plurality of switching modules are interconnected by a time-multiplexed switch. A connection between modules is established by sending messages between the originating and destination switching modules defining and selecting available channels for connection to the time-multiplexed switch. The time-multiplexed switch establishes a connection via selected channels associated with the originating and destination switching modules. Alternatively, a connection between switching modules may be established by sending messages between an originating and destination switching module defining and selecting a channel from a candidate set of channels such that the originating and destination switching modules negotiate to arrive at available channels to establish the connection.

Ardon et al (U.S. Pat. No. 4,866,708) disclose a channel ownership arrangement between switching modules wherein certain bidirectional channels between the switching modules are owned by different modules. Further, ownership may be modifiable to adapt to call traffic patterns.

Ho (U.S. Pat. No. 4,747,130) discloses a distributed processing telecommunication switching system wherein each of a plurality of switching modules includes a processor, a plurality of ports connected to office lines and/or trunks, a plurality of outlets for establishing intermodule connections, and a switching network for connecting ports and outlets within a module. The module processors are interconnected via a communication facility wherein resource allocation is accomplished by each module broadcasting to the other modules the resource that module has selected. Each module maintains the status of resources and independently determines resource availability.

Combs et al (U.S. Pat. No. 5,365,512), Gulliford et al (U.S. Pat. No. 5,384,776) and Teel et al (U.S. Pat. No. 5,392,278) disclose distributed switching networks exclusively for use in trunked mobile radio including a multi-site switch that routes audio signals between nodes. The switch includes a message bus and an audio time division multiplexed (TDM) bus wherein audio sources are preassigned audio channels on the audio bus. The audio sources constantly broadcast digitized audio signals over the audio time division multiplexed (TDM) bus within their preassigned time slots wherein routing is performed by selectively receiving the signals. The multi-site switch includes nodes that interface various site components and have substantially the same hardware to enable the nodes to be interchangeable. Each node includes audio modules and a controller module that supports audio modules wherein the node controller and audio modules may take the form of printed circuit boards connected to a common backplane.

The prior art systems suffer from several and significant disadvantages. Specifically, the prior art systems typically do not include a truly "open" architecture (e.g., an architecture that readily accommodates insertion of newly designed hardware and/or software) having central office quality, thereby making third party hardware and software enhancements difficult to incorporate into those systems. Further, circuit cards of prior art systems generally are incapable of functioning as a complete switch since the cards do not incorporate common resources required to process a call, and often require redundancy within each card to enhance fault tolerance, thereby necessitating synchronization of redundant resources, complicating software development, limiting call setup throughput, and increasing system costs.

Expandability or growth potential of prior art systems is commonly limited due to the expense and effort of incorporating additional hardware and software into those systems, thereby rendering prior art systems inflexible in relation to system port capacity. Similarly, time division multiplexed (TDM) bus capacity in prior art systems tends to be limited in growth potential, thereby causing increased blocking (i.e., calls may not be processed immediately since ports are not available) and degrading system performance. Further, prior art systems tend to allocate time slots to specific backplane slots or cards, thereby creating inflexible systems that waste resources and may require specific cards to be disposed in particular backplane slots. The allocation of time slots in this manner tends to prevent concentration of traffic (i.e., controlling the quantity of ports or time slots in relation to the quantity of calls that can be received in a particular backplane slot) since, generally, the quantity of time slots is predetermined and there is no switching between backplane slot ports and external sources of call traffic (e.g., lines or trunks). Communication between switching nodes in prior art systems may utilize Ethernet to facilitate message transmissions between nodes, however, Ethernet permits collisions for bus access (i.e., more then one unit at a time attempting to access the bus), thereby degrading message transference efficiency and introducing the possibility of lost messages. Although message transference is accomplished, the transaction may not appear as a point to point connection, thereby precluding use of commercially available software for standard integrated services digital network (ISDN) messaging. Fault tolerance within prior art systems typically requires a common entity to detect a failure and switch over to a redundant or spare component, thereby incurring the disadvantages of common resources described above. In addition, prior art systems typically do not provide a high degree of fault tolerance, such as dual distribution of clocks and power, redundant, independent message buses to enable failure detection and selection of an alternate message bus by any circuit card interfacing the message buses, and ensuring that a single point failure disables a maximum of half the system, thereby increasing the risk that a failure affects the entire switching system.

OBJECTS AND SUMMARY OF THE INVENTION

Accordingly, it is an object of the present invention to enhance operation of a telephone switch by distributing call processing functions to circuit cards within the switch that each function as a complete switch having resources to perform switching functions.

It is another object of the present invention to perform switching functions in a distributed telephone switching system without the use of a common centralized matrix.

Yet another object of the present invention is to enhance fault tolerance within a telephone switch by reducing redundancy and distributing call processing functions among circuit cards within the switch such that failure of a single card does not disable the entire switch.

Still another object of the present invention is to enhance adaptability of telephone switches to various applications by providing a telephone switch having an "open" architecture (e.g., an architecture that readily accommodates insertion of newly designed hardware and/or software).

A further object of the present invention is to enhance flexibility of distributed telephone switches by enabling any type of switch circuit cards to be inserted into a group of identical backplane slots within a switch in any fashion wherein each circuit card accessing a backplane data bus is assigned bus time slots to avoid collisions during data bus access for transmission of information over the backplane data bus within the switch. Similarly, each circuit card accessing a backplane message bus is provided with an opportunity to transmit information onto the backplane message bus one circuit card at a time to avoid collisions during message bus access.

Yet another object of the present invention is to enhance flexibility and expandability of telephone switches by enabling shelves containing switch cards within a telephone switch to be interconnected by a distributed matrix and thereby accommodate various quantity ranges of ports on each of numerous identical card slots.

Still another object of the present invention is to control concentration of traffic within a switch via flexible pre-assignment of various quantities of time slots to different switch circuit cards inserted into a backplane slot of the switch.

The aforesaid objects are achieved individually and in combination, and it is not intended that the present invention be construed as requiring two or more of the objects to be combined unless expressly required by the claims attached hereto.

According to the present invention, a multiple application switching platform includes a switch having a distributed open architecture and incorporating redundancy for enhanced fault tolerance. The switch includes at least one shelf having a midplane containing redundant high speed, high level data link control (HDLC) serial buses and redundant time division multiplexed (TDM) data buses. Shelves may be interconnected to form a group wherein the message and data buses of each group shelf contain substantially the same information. Various circuit cards are connected to each shelf midplane in order to perform call processing, wherein each card within a group accessing a data bus is pre-assigned a unique set of time slots for each data bus within which that card may transmit onto that data bus. Similarly, each card is identified by a unique identification number that is retrieved from the midplane slot. The card identification number, which is based on the position of a card within the midplane, typically includes the shelf and midplane slot number. The card identification numbers are utilized to permit each card within a group interfacing the message bus an opportunity to transmit a message onto the message bus. The circuit cards typically include line or trunk switch cards that each function as an independent switch and interface line or trunks to a shelf midplane. Line and/or trunk circuit cards communicate with other line and/or trunk circuit cards within a group via the message bus and transfer call information between cards (e.g., voice data) over the data bus in order to establish a connection. Further, each group includes a database/processor card that maintains billing and other information, and downloads switch configuration information (e.g., programs, tables, time slot assignments) to circuit cards. A data communications card may interface external host computers via an Ethernet interface, or common signaling systems (e.g., SS7, TR303). Switch, database/processor and data communications circuit cards each typically include an application processor and a communications processor to control call processing functions and handle messages, respectively. The communications and application processors communicate via a dual port RAM, and each processor includes a real time operating system to control messaging and call processing. In addition, each shelf contains power cards and power buses to distribute power to the shelf circuit cards, and expander cards for distributing common clock signals and enabling connection to other shelves within a group as described above. Thus, one card within a group is permitted to transmit on a single data bus during a time slot, while one card is permitted to transmit a message on a single message bus based on the card identification number.

Communication between lines or trunks connected to any group shelf is facilitated by switch circuit cards communicating with each other via messages sent over the message bus. The switch repeatedly cycles through each card identification number to provide each card an opportunity to transmit a message onto the message bus. The switch ceases cycling through the card identification numbers during transmission of a message such that only one card transmits a message on a single message bus at any one time. The messages coordinate the transmission and reception of call information, while the switch circuit cards transmit data (e.g., voice data) over the data buses. A switch master clock cycles through data bus time slots wherein only a single circuit card is permitted to transmit on a single data bus during each time slot, as described above, while each circuit card receives information during all time slots. Each shelf circuit card accessing a data and/or message bus includes specific circuitry to respectively enable data and/or message bus access in this manner.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

BRIEF DESCRIPTION OF THE DRAWINGS

FIG. 1 is a schematic block diagram of a single shelf of a multiple application switching platform according to the present invention.

FIG. 2 is a schematic block diagram of interconnections between a communications processor and an application processor disposed on a circuit card according to the present invention.

FIG. 3a is an electrical schematic diagram of an exemplary data bus access circuit for enabling a circuit card to transmit onto a midplane time division multiplexed (TDM) data bus during its assigned time slots according to the present invention.

FIG. 3b is a graphical illustration of an exemplary timing diagram for the circuit of FIG. 3a.

FIG. 4a is an electrical schematic diagram of an exemplary message access circuit for enabling a circuit card to transmit onto a midplane message bus based on the circuit card identification number according to the present invention.

FIG. 4b is a graphical illustration of an exemplary timing diagram for the circuit of FIG. 4a.

FIG. 5a is an electrical schematic diagram of an exemplary bus repeater circuit for transmitting bus signals between group shelves according to the present invention.

FIG. 5b is a graphical illustration of an exemplary timing diagram for the circuit of FIG. 5a.

FIG. 6 is a diagrammatic illustration of the manner in which a call from a trunk circuit card destined for a telephone station connected to a line circuit card is processed according to the present invention.

FIG. 7 is a diagrammatic illustration of the manner in which a call from a telephone station connected to a line circuit card destined for a trunk circuit card is processed according to the present invention.

FIG. 8 is a diagrammatic illustration of the manner in which a telephone call from a first telephone station connected to a first line circuit card destined for a second telephone station connected to a second line circuit card is processed according to the present invention.

DESCRIPTION OF THE PREFERRED EMBODIMENT

A multiple application switching platform or switch, preferably for use in telephone switching applications, includes a card cage or shelf having an internal backplane wherein circuit cards may be inserted into either side of the backplane. A backplane having this type of configuration is commonly referred to as a midplane. A shelf midplane typically includes only connectors, and does not have any electronic components (i.e., referred to as a passive midplane) except for circuit cards inserted into either midplane side as described above. Multiple shelves, typically a maximum of eight shelves, may be interconnected to form a group wherein the switching platform is essentially a collection of single circuit card switches inserted into at least one passive midplane with each midplane mounted in a self-contained card shelf with integral cooling. In fact, the only common circuit cards generally required on a shelf are power, clock and database/processor cards inserted into the upper rear portion (i.e., leftmost midplane side in FIG. 1) of the midplane as described below. It is to be understood that the terms "side", "front", "upper", "lower" and "rear" as used herein represent only points of reference in relation to a midplane and are not intended to limit the present invention to a specific configuration or orientation. Several groups of shelves may be interconnected via tandem switch cards to form larger systems that may utilize tandem switches, having these tandem switch cards, to accommodate expansion for handling 24,576 ports.

An architecture for a single shelf of a multiple application switching platform is illustrated in FIGS. 1–2. Specifically, a switching platform shelf includes a passive midplane 1 having several printed circuit cards connected on either side of the midplane for performing switching functions. The printed circuit cards typically include switch cards 2, database/processor cards 3, data communication cards 4, power cards 5 and expander cards 6. Further, relay cards, spare circuit cards, and other circuit cards performing various functions may also be connected to midplane 1 as described below. Midplane 1 receives these circuit cards on either midplane side for denser packaging, and further includes redundant power buses 10A and 10B, redundant message buses 9A and 9B, redundant clock distribution lines 8A and 8B, and redundant time division multiplexed (TDM) data buses 7A and 7B having several ports or time slots for transporting data. The switching platform utilizes +24V DC which is reduced to the appropriate voltage levels, such as 15V DC or 3.3V DC by the circuit cards for proper circuit card operation. Power buses 10A and 10B each distribute other voltages, such as +/−130V DC and +48V DC, that are utilized for miscellaneous functions (e.g., coin collect and return), and two redundant pairs of ringing supplies (i.e., ringing voltage in North America is typically 84V, 20 Hz). A voltage of −48V DC is connected directly to each front card slot described below for use by those cards (e.g., lines and E&M trunks) that require −48V DC for card operation.

Each shelf midplane 1 typically includes a plurality of circuit cards as described above collectively referred to as front cards, lower rear cards, and upper rear cards based on the position of the cards within the midplane. However, the cards and midplane slots may be arranged on midplane 1 in any manner such that a card is compatible with a midplane slot. The front portion (i.e., the rightmost midplane side in FIG. 1) of midplane 1 may include a maximum of twenty-seven front cards (i.e., the midplane includes a maximum of twenty-seven front card slots) in a twenty-four inch mounting, typically switch cards 2, that interface telephone lines, trunks and/or other facilities. Alternatively, midplane 1 may include a maximum of twenty front cards or front card slots when a nineteen inch mounting is utilized. Since a maximum of eight shelves may be interconnected to form a group as described above, a maximum of two-hundred sixteen front circuit cards may be inserted into the shelf midplanes wherein each front circuit card within a group utilizes the same pool of data bus ports or time slots. Since the front slots are substantially identical any combination of line, trunk and other facility interfacing switch cards 2, service circuits (e.g., tones and voice response), radio controllers, or tandem cards may be disposed within those slots. A front card accesses data buses 7A and 7B and message buses 9A and 9B via upper connectors (not shown), and connects to external facilities (e.g., lines, trunks and computers) through lower connectors utilized by lower rear cards described below. Each front midplane slot is substantially identical as described above except for a slot number encoded onto designated pins of midplane 1 and available to processors within each front card described below. A call is generally processed by establishing communications between front cards that interface facilities originating and terminating the call such that a systemwide common processor or other real time common resources are typically not needed for real time completion of the call (i.e., except for possibly trunk calls utilizing an SS7 (Signaling System Seven) protocol). However, the switching platform may accommodate real time use of common resources. For example, the switching platform may handle various real time common resource applications, such as "dumb switches" that require some or all of the call processing be performed by an external personal computer or workstation, or implementations involving switching calls to common tone or voice processing cards for call set-up. Therefore, switching platform software permits both centralized and distributed (i.e., a processor on each card performing card specific tasks) operation, while software implementation concentrates on fully distributed operation.

The lower rear portion (i.e., leftmost midplane side in FIG. 1) of midplane 1 may accommodate a maximum of twenty-seven lower rear cards (i.e., the midplane includes a maximum of twenty-seven lower rear card slots) wherein each lower rear card (not shown) is associated with a front card, and provides a transition from a standard midplane connector to an appropriate connector for a particular front card application. In other words, a transition lower rear card establishes proper connections within midplane 1 such that its associated front card can perform a specific application, such as access external line or trunk facilities. A typical transition lower rear card includes only connectors and does not include any active components. Alternatively, lower rear cards may function as relay substitution cards that disconnect one or more of the attached external line, trunk or other facility wires from their associated front cards and connect them instead to a flat cable extending to a substitute that serves as a spare for one or more similar cards (i.e., N+1 redundancy, wherein one spare card may replace any of N cards). Since most hardware or software failures affect a maximum of a single front card, this substitution capability enables proper operation of the entire switch after a failure of a front card. Further, the relay substitution cards may reroute traffic for maintenance in substantially the same manner described above. A pair of conventional or commercially available microcomputers, such as Siemens C515C, are disposed on each relay substitution card to control that card and communicate, via low speed serial buses included within message buses 9A and 9B described below, with database/processor cards 3 executing operation, administration, maintenance and provisioning (OAM&P) software described below. Front card substitution permits automatic and/or remote manual replacement of lines, trunks and/or other facilities interfacing a failed front card. The lower rear card slots are substantially identical, except for an electrically encoded slot number as described above for the front card slots.

A maximum of twenty-seven upper rear cards may be inserted into the upper rear portion (i.e., leftmost midplane side in FIG. 1) of midplane 1 (i.e., the midplane includes a maximum of twenty-seven upper rear slots), wherein the upper rear cards typically include common cards or support circuits, such as power cards 5, expander cards 6, data communications card 4 and database/processor cards 3. The functions of data communications card 4 and database/processor card 3 may be separated or combined as required, and may be implemented as either front or upper rear cards. A portion of the upper rear card slots is dedicated to particular cards, such as power cards 5 (e.g., logic power supply cards supplying +24V DC (dropped to 5V DC on each card) and miscellaneous power cards supplying +48V DC, +130V DC, −130V DC and power ringing) and expander cards 6 (e.g., including bus repeaters that extend data buses 7A, 7B, message buses 9A, 9B and clock distribution lines 8A, 8B to other shelves, and common polling hardware for high speed synchronous peer to peer communications described below), and are mechanically keyed to prevent insertion of inappropriate cards within those dedicated slots. The remaining upper rear slots are substantially identical, and all upper rear slots include encoded slot numbers available to those upper rear cards having processors. Most upper rear cards typically include a pair of microcomputers (not shown) for low speed serial communication as described above to report alarms and status, and accept configuration commands. The upper rear midplane slots typically have access to the same resources as the front midplane slots except that the upper rear midplane slots do not require the same high voltage power needed for telephone interfaces. In other words, the upper rear midplane slots require +24V DC, and have access to data buses 7A, 7B, clock distribution lines 8A, 8B and message buses 9A, 9B. Any common function that can not be performed on an upper rear card may be implemented on a front card. For example, when the required capabilities of a database/ processor card 3 can not be implemented on an upper rear card, a commercial VME single board computer may be mounted as a daughter card onto either a front or upper rear card. The front or upper rear card provides power, bus access (e.g., with separate access circuitry for each of the two message buses 9A, 9B described below) and peripheral mounting for disk drives and other devices. A pair of these single board computer daughter cards may be used for "dumb switch" applications instead of interfacing external personal computers or workstations as described above.

The switching platform may include multiple shelves that are interconnected by short flat cables extending between expander cards 6 of each shelf. A maximum of eight shelves may be interconnected in this fashion to form a group. Each shelf includes power supplies (i.e., power cards 5), but all shelves share time division multiplexed (TDM) time slots on data buses 7A and 7B, high speed message buses 9A and 9B, low speed communications buses within message buses 9A and 9B described below, and common processor/database cards 3. A single pair of expander cards 6 each contain a master clock described below that is shared by all shelves. Alternatively, a single pair of separate clock sources may be mounted on their own upper rear cards or externally. In other words, all shelves in a group function as if they shared a single extended midplane. Multiple groups may be interconnected by at least two tandem cards (not shown) that switch time slots between groups to form a larger switch. In other words, selected time slots on midplane data buses may be connected to a cable extending to similar cards in other groups. For larger systems, these cables extend to similar cards in a tandem switch, described below, that essentially interchanges time slots between groups. The tandem cards also function as a simple packet switch to deliver messages to the other groups, and may be used to directly interconnect two or three groups.

Eight or more shelf groups may be connected via tandem cards to tandem switches having the tandem cards described above. The tandem switches are configured based on a particular application and include sufficient resources to handle the desired inter-group traffic. Basically, the tandem switches form a simple single stage matrix that interconnects shelf groups to form a larger switch using substantially the same hardware and software as used in the groups. The presence of a tandem switch is virtually invisible to the call set-up software process. Simple tandem switches can interconnect groups to form a non-blocking (i.e., a connection is always available to immediately process a call) 16,384 port switch or a 24,576 port switch with three to one inter-group concentration. The tandem switches may include a two or greater stage matrix and can further expand the system to accommodate additional ports as required.

Message buses 9A and 9B are utilized for high speed peer to peer communications (i.e., each circuit card is connected to and utilizes the message buses for transference of message information) between front and upper rear circuit cards connected to the switching platform (i.e., circuit cards residing on any switching platform shelf). Message transmit privileges are granted sequentially via hardware to each card in a group (e.g., several hundred cards) based on a shelf number and midplane slot number described below. Message buses 9A and 9B typically include a set of high speed (i.e., approximately 8 megabits per second) serial high level data link control (i.e., HDLC, an industry standard synchronous data protocol) buses, however, various other protocols may be utilized by the message buses to facilitate message transference. Message buses 9A and 9B operate at the switching platform master clock frequency of 8.192 MHz (i.e., 8.192 megabits per second) and do not depend on any software entity for arbitration since only one card within a group is permitted to transmit on a message bus at any one time, thereby eliminating any bus contention. Further, independent low speed buses are included within each message bus 9A, 9B and are utilized for communications by circuit cards that do not need, or have room for redundant high level data link control (HDLC) hardware, to operate at the higher speeds. These circuit cards typically include small microcomputers, such as Siemens C515C, that provide low speed communications with database/processor cards 3 for alarm reporting, status monitoring and configuration download. In addition, the lower speed buses may be utilized for maintenance and administration, monitoring power supplies and message transference by expander cards 6 and lower rear circuit cards (i.e., generally utilized to replace failed front cards as described above). The low speed buses are available to all circuit cards, while the high speed buses are not available to lower rear cards. In other words, all cards within the switching platform include either high level data link control (HDLC) capability or a pair of microcomputers (not shown) for low speed communication, while database/processor cards 3 have both.

Clock distribution lines 8A and 8B distribute redundant clocks from a master switching platform clock such that a clock edge arrives at each circuit card within the switching platform at substantially the same time. Clock distribution lines 8A and 8B each include lines that are approximately equal in length wherein each line delivers the clock signal to groups of three front and upper rear circuit cards. Since midplane 1 can accommodate twenty-seven front and upper rear slots, clock distribution lines 8A and 8B each include nine individual lines extending from each switching platform master clock disposed within expander cards 6 as described above. Clock distribution lines 8A each extend from an expander card 6 having a master clock as described above to an appropriate quantity of connector pins (i.e., pins that extend through the midplane and contact corresponding or the same slots on the front and upper rear portions of the midplane). These connector pins distribute the clock to a group of three front and upper rear cards wherein a first clock distribution line 8A distributes the clock signal from a first expander card to the first through third midplane front and upper rear slots, while the remaining second through ninth clock distribution lines 8A distribute the clock signal from that expander card to the remaining fourth through twenty-seventh midplane front and upper rear slots with each clock distribution line 8A distributing the clock signal to three consecutive midplane front and upper rear slots. That is: the second clock distribution line 8A distributes the clock signal from expander card 6 to the fourth through sixth midplane front and upper rear slots; the third clock distribution line 8A distributes the clock signal from expander card 6 to the seventh through ninth front and upper rear midplane slots; the fourth clock distribution line 8A distributes the clock signal from expander card 6 to the tenth through twelfth front and upper midplane slots; the fifth clock distribution line 8A distributes the clock signal from expander card 6 to the thirteenth through fifteenth midplane front and upper rear slots; the sixth clock distribution line 8A distributes the clock signal from expander card 6 to the sixteenth through eighteenth midplane front and upper rear slots; the seventh clock distribution line 8A distributes the clock signal from expander card 6 to the nineteenth through twenty-first midplane front and upper rear slots; the eighth clock distribution line 8A distributes the clock signal from expander card 6 to the twenty-second through twenty-fourth midplane front and upper rear slots; and the ninth clock distribution line 8A distributes the clock signal from expander card 6 to the twenty-fifth through twenty-seventh midplane front and upper rear slots. Since clock distribution lines 8A distribute the clock signal to each shelf circuit card, and since expander card 6 is an upper rear circuit card, a clock distribution line 8A essentially loops back to the expander card to distribute the clock signal to the expander card.

Clock distribution lines 8B include nine individual lines that each extend from a second expander card 6 having a master clock as described above to an appropriate quantity of connector pins that distribute the clock signal to a group of three midplane front and upper rear slots in substantially the same manner described above except that clock distribution lines 8B distribute the clock signal to the midplane front and upper rear slots in reverse or descending order. For example, a first clock distribution line 8B distributes the clock signal from the second expander card to the twenty-seventh through twenty-fifth midplane front and upper rear slots, while the remaining second through ninth clock distribution lines 8B distribute the clock signal from that second expander card to the twenty-fourth through first midplane front and upper rear slots with each clock distribution line 8B distributing the clock signal to three consecutive midplane front and upper rear slots. That is: the second clock distribution line 8B distributes the clock signal from the second expander card to the twenty-fourth through twenty-second front and upper rear midplane slots; the third clock distribution line 8B distributes the clock signal from the second expander card to the twenty-first through nineteenth midplane front and upper rear slots; the fourth clock distribution line 8B distributes the clock signal from the second expander card to the eighteenth through sixteenth midplane front and upper rear slots; the fifth clock distribution line 8B distributes the clock signal from the second expander card to the fifteenth through thirteenth midplane front and upper rear slots; the sixth clock distribution line 8B distributes the clock signal from the second expander card to the twelfth through tenth midplane front and upper rear slots; the seventh clock distribution line 8B distributes the clock signal from the second expander card to the nine through seventh midplane front and upper rear slots; the eighth clock distribution line 8B distributes the clock signal from the second expander card to the sixth through fourth midplane front and upper rear slots; and the ninth clock distribution line 8B distributes the clock signal from the second expander card to the third through first midplane front and upper rear slots. Therefore, each shelf circuit card slot receives two redundant clock signals at substantially the same time, or in other words, all circuit cards in a shelf receive redundant clock signals simultaneously. Clock distribution lines 8A and 8B may be connected within the shelf midplane in any manner capable of distributing redundant clock cycles to the midplane slots at substantially the same time.

Time division multiplexed data buses 7A and 7B, by way of example, each include sixteen data lines (i.e., two (eight bit) bytes wide) and an enable lead for each byte (i.e., eight bits) of data on each bus. In other words, each data bus 7A, 7B contains eighteen lines wherein sixteen lines transport data and two lines (i.e., one for each data byte) carry control information. Each data bus 7A, 7B has two sets of one byte (i.e., eight bit) wide time division multiplexed (TDM) buses wherein each one byte wide bus, includes 1,024 time slots within each 125 microsecond period (i.e., 8 KHZ), commonly referred to as a frame, thereby yielding 4,096 time slots or ports in the exemplary embodiment (i.e., 1,024 time slots multiplied by four one byte wide time division multiplexed (TDM) buses). The quantity of time slots utilized by data buses 7A and 7B may be modified (i.e., increased or decreased) wherein data buses 7A, 7B may each include additional one byte wide buses and associated enable leads providing a maximum of 6,144 time slots with 3,072 time slots on each of the respective data buses 7A and 7B. However, data buses 7A, 7B may be arranged in any manner to transport data in larger or smaller units while maintaining similar time slot quantities for each data bus. The frame rate (i.e., 8 KHz) is utilized by all digital telephone systems connected to the world network, thereby enabling the switching platform to communicate worldwide. Each one byte wide data bus is accessed by a data bus access circuit (FIG. 3a) described below such that no single point failure can interfere with more than half of the total port capacity of the switching platform. Further, isolating functions within the switching platform, such as independent access circuitry for each data bus portion, minimizes the chance that two one-byte wide buses may be impacted by a failure. Each set of two one-byte wide data buses is independent, thus a single point failure can not impact both sets of data buses 7A and 7B. Data buses 7A and 7B, in the exemplarily embodiment, provide 4,096 digital signal zero (i.e., DS0, the lowest level in the world wide digital telephone hierarchy) ports or time division multiplexed (TDM) time slots for transference of information between circuit cards. The time slots are partitioned into two separate groups to enhance fault tolerance wherein each bus 7A and 7B utilizes 2,048 time slots. Multiple time slots may be combined for bandwidths greater than 64 KB (i.e., kilobits), while sub-rate access is available in multiples of 8 KB (i.e., kilobits). Since front midplane slots are identical, and can receive any combination of line, trunk and/or other facility interfacing cards, and since a majority of the upper rear midplane slots are similarly identical, time slots for transmission over data buses 7A, 7B may be assigned, via software, to individual circuit cards within the front and upper rear midplane slots wherein the circuit cards may select any one of their assigned time slots to utilize for transmission of data onto the data buses. Time slots may be used independently or in redundant pairs as required, and are generally assigned equally to data buses 7A, 7B such that no more than half the time division multiplexed (TDM) traffic capacity of each circuit card is lost during a bus failure. The time slot assignments are generally based on the maximum number of ports a circuit card may utilize and the desired level of blocking and redundancy for that card. These goals are balanced against the quantity of line and trunk circuits or other facilities anticipated in order to arrive at each card's port assignment during system configuration. Thus, software configurable time slot assignments enable trade offs between trunk capacity, traffic handling and redundancy. For example, line circuits and plain old telephone service (POTS) subscriber lines may utilize twenty-four slots, while a twelve digital trunk circuit equipped with European E1 trunks may utilize 360 time slots. Further, an E&M (i.e., an old analog interface) card may only accommodate six trunks per card and require six or twelve (i.e., when redundancy is incorporated) time slots. Therefore, applications may require quantities of time slots in the ranges approximately from six through twelve time slots to 360 through 720 time slots depending upon whether or not redundancy is incorporated.

Since time slots are assigned in software as described above and data buses 7A, 7B are available to circuit cards on midplane 1, the switching platform has flexibility to assign time slots in specific arrangements to adapt to various applications. For example, circuit cards interfacing trunk circuits may be configured to be non-blocking redundant (i.e., a ratio of two ports per line to immediately process calls), circuit cards interfacing business lines may be configured to be non-blocking non-redundant (i.e., a ratio of one port per line without redundancy), while circuit cards interfacing residence lines may be configured to enable the lines to share ports (i.e., a ratio of less than one port per line). Once the time slots have been assigned, hardware on each circuit card allows access to data buses 7A, 7B only during those assigned time slots, thus protecting data buses 7A, 7B against erroneous attempts to access other time slots. Each circuit card may receive during any time slot, but may transmit only during the assigned time slots. Additional protection of data buses 7A, 7B may be provided by limiting, via hardware, the quantity of time slots the bus access circuits permit circuit cards to use based on the card type. For example, a single purpose twenty-four line station card may be limited by hardware to twenty-four time slots on each bus 7A, 7B irrespective of the software configuration.

Midplane 1 typically includes twenty-seven slots for receiving a plurality of switch cards 2 to perform switching functions. Each switch card 2 is essentially an individually self-contained switch having virtually all resources to process calls wherein each switch card operates autonomously and communicates with other circuit cards via the midplane. This arrangement is analogous to individual telephone exchanges in a public network that communicate with each other via a trunk network. Switch cards 2 utilize midplane 1 to receive power from power buses 10A and 10B, receive and transmit messages via message buses 9A and 9B, and receive and transmit data via time slots on data buses 7A and 7B (i.e., analogous to trunk circuits between central offices in a public switched telephone network (PSTN)). Specifically, each switch card 2 includes a motherboard having daughter cards for lines, trunks, and digital signal processing (DSP) resources. The motherboard provides power, data and message bus access, and progress tones for the switch card. A maximum of six line or trunk daughter cards may be connected to the motherboard wherein each daughter card interfaces four pairs of wires extending to a main distribution frame (MDF) from lower rear cards via a twenty-five pair rear cable (i.e., twenty-four pairs are used since a maximum of six daughter cards each interface four pairs). The motherboard further includes an additional two daughter card slots that are substantially similar to the daughter card slots described above except that the additional daughter card slots lack access to the main distribution frame. These additional daughter card slots are typically utilized for tone receiver digital signal processing cards to decode signaling tones or perform other internal functions. Additional digital signal processing or other cards may be connected to the motherboard, however, these cards must utilize the daughter card slots for the line and/or trunk daughter cards. Each line interfacing daughter card provides signals from four loop start or ground start analog subscriber lines and includes hardware interfaces that supply battery and ringing to the provided lines and perform analog to digital (i.e., A/D) conversion for placement of the line signals onto the midplane data buses 7A, 7B during assigned time slots. Similarly, trunk interfacing daughter cards direct signals from two T1 or E1 trunks (i.e., North American T1 signals having 1.536 megabits ($10^6$ bits) of twenty-four 64,000 bit per second samples in addition to eight kilobits ($10^3$ bits) of framing information, or 1.544 megabits, and European E1 signals having 2.048 megabits ($10^6$ bits) having thirty digital signal zero signals of 64,000 bits per second in addition to 128 kilobits ($10^3$ bits) of signaling and framing information) onto time division multiplexed (TDM) time slots on the midplane data buses 7A, 7B, thereby yielding 288 or 360 digital signal zeros (i.e., DS0, the lowest level within the standard worldwide digital telephone hierarchy) per motherboard. Thus, a switch card motherboard may serve twenty-four lines (i.e., six cards of four lines each) or a maximum of twelve T1/E1 (i.e., digital signal one, or DS1, the next higher level within the standard worldwide digital telephone hierarchy) trunks (i.e., six cards of two trunks each) with on board digital signal processing tone receivers or other voice processing as required. However, high volume applications, such as plain old telephone service lines, may justify a dedicated twenty-four line switch card that does not include the flexibility and cost of daughter cards (i.e., typically no daughter cards are utilized by the dedicated switch card). Further, since digital signal processing cards may be placed in any of the daughter card slots, a switch card 2 can be dedicated to voice processing. In addition, the motherboard may receive various other daughter cards, such as quad integrated services digital network (ISDN) basic rate interface (BRI) cards, quad loop trunks, and single E&M trunks.

Each switch card motherboard includes an interface 11 (i.e., typically implemented as a daughter card as described above), tone senders and receivers 13, an application processor 12 in communication with a communications processor 16 via a dual port random access memory (RAM) 15, clock select and power circuits 23, 24, respectively, data bus access circuitry 14, 21 and message access circuitry 19. Clock select circuitry 23 selects one of two redundant clocks (i.e., the 8.192 MHz clock described above) received via receiver circuits 22 (i.e., one receiver 22 is associated with each clock signal) from clock distribution lines 8A and 8B and distributes the clock to switch card circuitry. Power circuit 24 receives +24V DC from either or both power buses 10A and 10B and converts that power to voltages required for operation of switch card 2. Interface 11 enables switch card 2 to physically interface a line, trunk, tandem switch described above or other external facility or circuit, and is controlled by application processor 12 that enables an external circuit to be connected through interface 11 to optional tone senders and/or receivers 13 (e.g., for encoding/decoding signaling such as dual tone multi frequency (DTMF), multi-frequency type R1 (MFR1, North American inter-office protocol), multi-frequency compelled type R2 (MFCR2, Asia inter-office protocol). Application processor 12 basically handles call set-up, supervision, termination and billing, while communications processor 16 controls high speed peer to peer message bus communications between cards for call set-up, configuration and maintenance. New features are implemented within application processor 12 as described below, while software within communications processor 16 provides a stable environment that seldom changes.

Interface 11 typically includes an industry standard pulse code modulation (PCM) coder/decoder (CODEC, not shown) that converts an analog signal from an external circuit to a companded digital signal. The companded digital signal refers to a pulse code modulated (PCM) encoded analog signal that is non-linear and provides a wider dynamic range than eight bits of a linear code. Thus, a coder/decoder translates analog voice band signals into eight bit pulse code modulated (PCM) samples at an industry standard rate of 8,000 samples per second. Further, the coder/decoder includes a decoder that receives eight bit companded digital signals (i.e., non-linear digital samples at a rate of 8,000 samples per second) and converts these companded signals to analog signals in order to apply the analog signals to the external circuit (e.g., lines, trunks or other facilities). Interface 11 may interface digital trunk circuits (i.e., the digital trunk circuits do not include CODECS) that are simply transmission facilities to deliver 8,000 eight bit samples as 64,000 bit per second digital signal zero (i.e., DS0, the lowest level within the standard worldwide digital telephone hierarchy) signals. Interface 11 may further combine twenty-four digital signal zero signals into digital signal one (i.e., DS1, the next higher level within the worldwide digital telephone hierarchy including North American T1 signals having 1.536 megabits ($10^6$ bits) of twenty-four 64,000 bit per second samples in addition to eight kilobits ($10^3$ bits) of framing information, or 1.544 megabits, and European E1 signals having 2.048 megabits ($10^6$ bits) having thirty digital signal zero signals of 64,000 bits per second in addition to 128 kilobits ($10^3$ bits) of signaling and framing information). Tone senders and receivers 13 are preferably implemented by digital signal processors, such as Texas Instruments 320C54 and the like, employing standard algorithms. The digital signal processors are industry standard and it is to be understood that those of ordinary skill in the art could program the signal processors with the standard algorithms to enable the signal processors to receive and transmit tone signaling information. Application processor 12 controls tone senders and/or receivers 13 and interface 11 to connect individual speech paths within the interface, to the switching platform.

A pair of embedded processors (FIG. 2), namely applications processor 12 and communications processor 16, are disposed on each switch card motherboard to provide all processing resources required to connect a call. Specifically, application processor 12, typically an industry standard, conventional or commercially available 486 processor, such as the National 486SXF or equivalent processor, includes Boot electrically programmable read only memory (EPROM) 121, Program and Tables random access memory (RAM) 122, non-volatile Flash read only memory (ROM) 123 and universal asynchronous receiver/transmitter (UART) 124. Application processor 12 is utilized to control call set-up, supervision and termination, interface 11, data bus access and specific call processing. Similarly, communications processor 16 includes Boot EPROM 125, Program and Tables RAM 126, and Non-Volatile Flash ROM 127. Communications processor 16 is dedicated to facilitating peer to peer communications between circuit cards, via software common to all cards, by controlling a universal synchronous receiver/transmitter (USRT) 616 described below for transferring messages over message buses 9A, 9B. In other words, communications processor 16 provides communications to other cards in the system, while application processor 12 controls interface 11 to set-up calls between switch cards 2 through communication with communication processor 16. The components associated with application processor 12 and communications processor 16 (i.e., boot EPROMs 121, 125, program and tables RAMs 122, 126 and non-volatile Flash ROMs 123, 127) are typically implemented by conventional and/or commercially available products. Boot EPROMs 121, 125 for respective processors 12, 16 each typically include software for initializing applications processor 12 and communications processor 16 at processor initialization (i.e., power-up). The boot program stored in each EPROM 121, 127 reads a register to determine the cause of the initialization, such as power-up, expiration of a watch dog timer or manual reset. The boot program further reads the card type, hardware revision level, and card identification number (i.e., shelf and slot number). Flash ROMs 123, 127 contain tables and software required for call processing wherein the boot program checks the program and tables stored in these flash ROMs for valid checksums and communicates program and table revision levels to database/processor card 3 such that programs and tables having later or current revision levels contained in database/processor card 3 may be downloaded to the flash ROM memories when the respective memories contain old or obsolete tables or software. Application processor 12 and communications processor 16 communicate via dual port RAM 15 such that software within the application and communications processors do not have to be coordinated or accommodate concurrent tasks executing within the communications processor and application processor, and any critical timing issues associated with inter-processor communications are alleviated. Processors, such as the National 486SXF, provide exceptional processing power, typically exceeding requirements of switch card applications, thereby adequately handling processing tasks and easing the software design. Program and tables RAMs 122, 126 each contain details about the lines, trunks or other facility interfaced by that card. An abbreviated database is maintained in RAMs 122, 126 and includes information relating to all trunks, lines and other facilities within the switching platform in order to provide pointers for permitting circuit cards to direct messages to other circuit cards associated with a desired line, trunk or other facility. Alternatively, broadcast polls may be utilized if the database is not maintained in RAMs 122, 126 on each card, or a common database on a separate card or external computer may be utilized to store the information. Call processing is accomplished in substantially the same manner irrespective of the manner in which line, trunk and facility information is stored. Universal asynchronous receiver/transmitter (UART) 124 is disposed within each processor 12, 16 for debug access in order to test the processors.

Applications processor 12 controls access of interface 11 to TDM transmit and receive circuit 14, wherein circuit 14 enables access to each of the two one byte halves of midplane data buses 7A and 7B via respective transceivers 20. Circuit 14 may accommodate several one byte portions of data buses 7A, 7B combining to provide the appropriate quantity of time slots as described above, however, two one byte portions of each data bus 7A, 7B are associated with circuit 14 for illustrative purposes. Transceivers 20 transmit onto each data bus 7A, 7B upon being enabled by data bus access circuits 21. Each switch card includes a pair of transceivers 20, and data bus access circuits 21 wherein each transceiver 20 and data bus access circuit is associated with one data bus 7A or 7B to prevent a single point hardware failure from interrupting service to the entire switching platform. Since there are two data buses 7A and 7B on each midplane, any single point hardware or software failure can at most interfere with half of the total data bus time slots. Therefore, access by each switch card 2 to data buses 7A and 7B is divided evenly between the data buses wherein each data bus 7A, 7B is divided into two one byte portions. Time slots from switch card internal serial buses (not shown) are presented to data bus access circuits 21 to enable the access circuits to permit transmission onto the midplane data buses 7A, 7B in proper sequence. Prior to each time slot, data bus access circuits 21 each consult a 2,048 bit transmit map RAM organized as 1,024 two bit words as described below to determine if the upcoming time slot has been assigned to the switch card. The transmit map RAM is loaded by communications processor 16 in response to receiving data at card power-up. If a transmit bit within transmit map RAM is set, a sample is placed onto the half of the data bus associated with the data access circuit having a set transmit bit wherein only one card within a group is permitted to transmit onto one byte half of each data bus 7A, 7B at any one time during a particular time slot. In other words, each one byte half of data bus 7A may receive data from only one card within a group during a particular time slot, while each one byte half of data bus 7B may similarly receive data from only one card (i.e., the same or different card transmitting onto data bus 7A) within a group during a particular time slot wherein the cards may transmit data onto the four separate one byte halves of data buses 7A, 7B simultaneously. In addition, TDM transmit and receive circuit 14 may further be configured to send a repeating test pattern when instructed by application processor 12. This test pattern may be sent just prior to connecting an originating call. The test pattern is received by a terminating or destination card, wherein the test pattern is modified to include the terminating card identification number and returned to the originating card for verification by TDM transmit and receive circuit 14. Typically, this test function is executed periodically as part of the switching platform Built in Test (BIT) function.

Data bus access circuits 21 are each typically implemented by a field programmable gate array (FPGA) that essentially functions to enforce assigned time slots and simplify routing software. Each data bus access circuit 21 is controlled by communications processor 16, wherein communications processor 16 provides instructions to data bus access circuits 21, from database/processor card 3 or other entity, relating to the time slots on data buses 7A and 7B that TDM transmit and receive circuit 14 is permitted to access. This arrangement ensures that transceivers 20 transmit onto respective data buses 7A, 7B at particular time slots, and enables the switching platform to utilize a common pool of time slots in any arrangement. Thus, each switch card and other upper rear cards (e.g., database/processor card) within a maximum capacity 216 switch card system (i.e., eight shelves multiplied by twenty-seven switch cards) may utilize the same time slots in any desired fashion. TDM transmit and receive circuit 14 captures all time slots and places selected receive bytes onto local time division multiplexed (TDM) serial buses during a succeeding 125 microsecond period or frame for transference to coders/decoders (CODECs), DS1 interfaces or other circuitry as described below. The selection process is controlled by application processor 12. TDM transmit and receive circuit 14 may also provide progress tones previously stored in an otherwise unused portion of its time slot storage RAM.

Communications processor 16 utilizes serial ports 17, preferably high level data link control (HDLC) universal synchronous receiver transmitters (USRT), to communicate with message buses 9A and 9B via respective transceivers 18 (i.e., a transceiver 18 is associated with each message bus 9A, 9B). Transceivers 18 are controlled by respective message access circuits 19 wherein each message access circuit 19 is preferably implemented by a field (FPGA) and is associated with a message bus 9A or 9B. Each circuit card accessing the message bus (i.e., switch card 2, database/processor card 3 and data communications card 4) includes an independent message access circuit substantially similar to message access circuit 19 for each message bus 9A, 9B wherein access circuitry collectively sequentially permit one card within a group to transmit onto message buses 9A and 9B at any one time. Message bus 9A may receive a message from only one card within a group at any one time, while message bus 9B may similarly receive a message from only one card (i.e., the same or different card transmitting onto message bus 9A) within a group at any one time wherein the cards may transmit messages onto separate message buses 9A, 9B simultaneously. Message access circuits 19 count common 8.192 MHz master switching platform clock while a respective hold line associated with each message bus 9A, 9B and available to each card is not driven low. The respective hold line is driven low by a circuit card transmitting onto the message bus associated with that hold line such that the message access circuits associated with that message bus do not count clocks during transmission of a message onto that message bus. When the clock count within a message circuit 19 equals a particular card identification number, a universal synchronous receiver/transmitter (USRT) within a message access circuit is permitted to transmit onto the associated message bus when a message has been loaded into that receiver/transmitter. If there is no message loaded within the receiver/transmitter when the clock count equals the card identification number, a subsequent sequential card message access circuit is given an opportunity to transmit onto that associated message bus during each succeeding clock cycle until a circuit card waiting to send a message is reached. Message access circuit 19 drives the hold line to a low state during transmission of a message to prevent other card message access circuits from counting clocks until the entire message has been transferred to the associated message bus, or a timer expires due to excessive length of the message. A respective master programmable logic device (PLD) or counter associated with each message bus 9A, 9B counts clocks while the hold line is not driven low, and issues a reset to respective message access circuits when each respective counter cycles through all card identification numbers (i.e., approximately 400 shelf and card slot numbers). Typically, less than fifty microseconds is required to cycle through the card identification numbers when the message access circuits are not prevented from counting by other cards requesting permission to transmit. The universal synchronous receiver/transmitter (USRT), preferably dual, within each message access circuit 19 further utilizes direct memory access (DMA) to place incoming messages into RAM or other devices (e.g., the communications processor RAM) when the incoming messages are addressed to the card's identification number, or if the message is broadcasted to a particular card type that matches the card's characteristics. Since switch card 2 includes redundant message access circuits 19, further redundancy in message buses 9A, 9B and associated communications processor 16 is not required. However, such redundancy may be desirable to handle large volumes of incoming messages including broadcasts. Thus, a database/processor card 3 may include dual communications processors to accommodate large traffic loads, whereas line or trunk cards 2 need only a single communications processor.

Database common processor or database/processor card 3 is typically inserted within a midplane front slot, however, it may also be inserted within a midplane upper rear slot. Database/processor card 3 provides a standard computer platform to execute software common to an entire group (i.e., a maximum of eight interconnected shelves), and is typically provided in pairs for redundancy. Specifically, database/processor card 3 includes a communications processor 33 in communication with an application processor 31 via dual port RAM 32, serial ports 35, transceivers 36, message access circuits 34, power circuit 38 and an interface 30. Communications processors 33, serial ports 35 transceivers 36 and message access circuits 34 are substantially similar to, and function in substantially the same manner as, corresponding components within switch card 2 (i.e., communications processor 16, serial ports 17, transceivers 18, and message access circuits 19) described above to facilitate interfacing message buses 9A, 9B. Communication processor 33 interfaces with message buses 9A and 9B to communicate peer to peer with other database/processor cards 3, switch cards 2, data communication cards 4 or any other circuit cards connected to the front or upper rear midplane slots. Database/processor card 3 provides common resources, such as software for downloading and time slot assignment for configuring switch cards 2 and data communications card 4. Further, database/processor card 3 functions as a database and downloads programs, configurations and tables, performs database administration and configuration management functions, collects and delivers billing records (e.g., call detail records as described below), performs operation, administration, maintenance and provisioning (i.e., OAM & P) functions, updates tables, accesses hardware for maintenance, maintains traffic statistics, logs errors, monitors and reports alarms and performs other housekeeping functions. One or more database/processor cards 3 may be utilized to perform these functions wherein software may be combined into one pair of database/processor cards 3 or distributed over two or more pairs of these cards as required. Moreover, database/processor card 3 may also include an optional disk drive for storing large quantities of data including a line information database, (e.g., information associated with line circuits connected to switch cards 2), a trunk information database (e.g., information associated with trunk circuits connected to switch cards 2) and billing data collected from switch cards 2. Communications processor 33, in combination with application processor 31, preferably a 486 or 68000 class or equivalent processor with sixteen megabytes ($10^6$ bytes) of RAM, manages high speed communications as described above, while separate microcomputers (not shown) are available to poll low speed serial channels within message buses 9A and 9B described above for maintenance and configuration download information. Application processor 31 is connected to communications processor 33 via dual port RAM 32 as described above and controls an interface 30 in substantially the same manner described above for switch card 2. Interface 30 (e.g., external serial or Ethernet interface) is utilized to transfer administration, maintenance and billing information between the switching platform and external apparatus, such as computers, modems and craft terminals (i.e., craft terminals are typically utilized by operators to access and control the switching platform), and provides access for database management, billing data delivery, and maintenance to external local or remote computers. An external workstation may also be connected for "dumb switch" applications as described above. Power circuit 38 receives +24V DC from either or both power buses 10A and 10B and provides the required voltages for use by database/processor card 3.

Data communications card 4 is similar to database/processor card 3 and is typically inserted into a midplane upper rear slot. Specifically, data communication card 4 includes communications processor 44 in communication with an application processor 42 via a dual port RAM 44, serial ports 46, transceivers 48, message access circuits 47, clock select circuit 52, power circuit 54, serial ports 51, Ethernet interface 41, TDM transmit and receive circuit 45, transceivers 49 and data bus access circuits 50. Communications processor 33, serial ports 46, transceivers 48 and message access circuits 47 are substantially similar to, and function in substantially the same manner as corresponding components within switch card 2 and database/processor card 3 described above to facilitate interfacing message buses 9A, 9B. Similarly, TDM transmit and receive circuit 45, transceivers 49 and data bus access circuits 50 are substantially similar to, and function in substantially the same manner as, corresponding components within switch card 2 to facilitate interfacing data buses 7A and 7B described above. Data bus access circuits 50 are configured by communications processor 44 in response to instructions from database/processor card 3 in substantially the same manner described above. Since communication between cards is peer to peer, any number of data communications cards 4 may be utilized within midplane upper rear slot capacity. Application processor 42 communicates with communication processor 44 via dual port RAM 43 as described above, wherein application processor 42 includes serial ports 51 to interface and serve as protocol platforms for common signaling systems, such as Signal System Seven (SS7), TR303, IS41 (i.e., each of these protocols is similar to an x.25 packet protocol wherein these packet protocols are used worldwide for sending messages between telephone exchanges), and other industry specific functions, wherein these protocols may be assigned to their own pair of data communications cards 4. Application processor 42 further includes at least one Ethernet interface for connection to personal computer workstations for receiving control and/or configuration messages, transferring billing data, or to utilize the workstation for any applications requiring external computers. In other words, data communications card 4 may be used to provide a smart network interface and function as a gateway to external host computers providing a host to switch applications program interface (API) translation. In addition, data communications card 4 may further include DS0A/C ports, and isolated EIA232/422 ports. Since the functions of data communications card 4 coincide with the functions of database/processor card 3, and since database/processor card 3 may be inserted into midplane front or upper rear slots, database/processor cards 3 and data communications card 4 may be combined or separated as desired. Any of the software functions described above may be combined into a single pair of data communication cards 4 or database/processor cards 3 or partitioned among several of those cards to simplify software integration and reduce processor loading. Clock select circuit 52 within data communications card 4 selects one of two redundant clocks (i.e., the master 8.192 MHz clock described above) received via receiver circuits 53 from clock distribution lines 8A and 8B and distributes the clock to data communications card circuitry. Power circuit 54 receives +24V DC from either or both midplane power buses 10A and 10B and converts that voltage to +5V DC and/or other voltages required for operation of data communications card 4.

Expander card 6 distributes clocks to all card slots at substantially the same time via clock distribution lines 8A and 8B as described above, and repeats signals on the data and message buses such that each shelf within a group may be interconnected and contain the same information on all group data and message buses. Each midplane shelf typically includes expander cards 6 that are disposed in pairs for redundancy and include small microcomputers as described above with low speed communications capability for maintenance and administration. Specifically, each expander card 6 incudes a master clock source 61 (i.e., only two expander cards within a group include a master clock source for redundant clocks), driver circuits 62 bus repeater circuits 63 and power circuit 64. Clock source 61 may be Implemented by a precision oscillator either free running or synchronized to external sources, such as a clock reference from a building integrated timing system in telephone exchanges, an external T1 or E1 transmission facility or a global positioning system (GPS) receiver. The output of clock source 61 is transferred to clock distribution lines 8A and 8B via driver circuit 62 wherein each driver circuit is associated with one line of clock distribution lines 8A or 8B such that each expander card typically includes nine driver circuits 62 and distributes clocks to either clock distribution lines 8A or 8B. Bus repeater circuit 63 on each expander card repeats a single two byte wide data bus 7A or 7B and a single message bus 9A or 9B to expander cards 6 residing on other shelves. Thus, bus repeater circuit 63 enables all shelf data and message buses within a group to contain and distribute the same information. A portion of the midplane upper rear slots may only receive expander card 6 (i.e., expander card 6 is slot specific), and certain other midplane upper rear slots are similarly dedicated, as opposed to the midplane front slots that are interchangeable. For example, expander cards 6 may be inserted into the first and twenty-seventh midplane upper rear slots, and power cards 5 may be inserted into the seventh, tenth, thirteenth, sixteenth, nineteenth and twenty-first midplane upper rear slots. Six upper rear midplane slots are reserved for power cards 5, and two upper rear midplane slots are reserved for expander cards 6. However, power cards 5 may be wider than one midplane upper rear slot, and render some upper rear slots unavailable, thereby providing approximately fourteen upper rear slots for receiving data communications card 4. Power circuit 64 receives +24V DC from either or both power buses 10A and 10B and converts that voltage to +5V DC and/or other voltages required for operation by expander cards 6.

Midplane 1 typically includes at least two power cards 5, disposed in pairs for redundancy. Specifically, each power card 5 includes an inverter 59 for converting input power of typically −48V DC to +24V DC for distribution to power buses 10A and 10B. Inverter 59 is typically implemented by conventional or commercially available industry standard power supply units. A pair of small microcomputers described above (not shown) with low speed communications capability for interfacing the low speed serial buses within message buses 9A, 9B, is utilized for transference of maintenance and administration information. Power cards 5 preferably operate in a load sharing mode, in other words, while each power card 5 and power circuits 24, 38, 54 and 64 are operational, the load is shared equally between the power cards and power buses. However, when one of the power cards or buses fail, the midplane circuit cards receive power from the operational power card or bus. Alternatively, the power cards may operate in hot-standby mode wherein one power card distributes all the power to the power buses, and upon failure of the original power card, a redundant power card replaces the failed original card and distributes power to the power buses.

The distributed architecture and redundancy of the switching platform described above ensures that no single point failure is permitted to disable the entire switching platform. Generally, calls are set-up using only the hardware and software resources of the originating and terminating switch cards 2. A circuit card may partially or fully fail, but all other circuit cards in the system continue to function properly. Redundancy within each circuit card is required only to the extent necessary to ensure that a single point failure cannot affect both sets of any redundant common resources (e.g., the data and message buses). Therefore, independent circuits are required on each card that accesses the midplane data and message busses. Any failure in the rest of a circuit card has no effect beyond that card. Common resources, such as power cards 5, expander cards 6 (i.e., the clock distribution) and database/processor cards 3 are disposed in redundant pairs and preferably operate in a load-sharing mode (i.e., each card handles approximately half the tasks) as opposed to hot standby (i.e., one card functions until failure wherein the second circuit card replaces the failed first circuit card). The switching platform connects calls after a failure of any one component or resource wherein calls in progress during a failure may be lost, however, a user may hang-up and immediately re-establish the call. When substitution is provided as described above, a failed switch card may be replaced typically without dropping connected calls carried by the failed switch card.

The switching platform may be configured, via software, for various traffic capacities by assignment of time slots (i.e, between the capacity of a fully functioning switching platform and the capacity of a switching platform after a failure). The switching platform may partially or totally be configured with one-hundred percent redundancy such that non-blocking access (i.e., a port is available to immediately accommodate a call) to all circuits can be maintained by assigning a quantity of time slots approximately equal to twice the quantity of lines or trunks that require non-blocking access after a worst case single point failure (i.e., a ratio of two time slots for each trunk or line). The switching platform may also be configured such that, depending upon traffic, some blocking is permitted after a failure. Partial redundancy permits more total lines or trunks to be connected at the expense of some blocking after a failure. Further, the switching platform may be configured with some blocking even when the switching platform is fully operational wherein a failure increases the degree of blocking but still permits calls to be completed. This flexibility permits, by way of example, a switch with thousands of low traffic residential lines to be configured for partial blocking, hundreds of business lines to be configured as non-blocking but non-redundant, and hundreds of trunks to be configured with non-blocking and redundant access.

In addition, the switching platform architecture is truly "open" to permit additional hardware and/or software to be incorporated into the switching platform for enhanced features. Customer designs are ensured compatibility via the data bus and message access circuits controlling access to the data and message buses. Further, the distributed software architecture enables software to be inserted into the switching platform with little effect on existing switching platform software. The switching platform open architecture enables configuration for numerous switching applications including advanced intelligent network (AIN), signaling system seven (SS7), central office (CO) adjunct, plain old telephone service (POTS), integrated services digital network (ISDN), digital loop carrier (DLC) with call completion (i.e., a replacement for community dial office (CDO)), computer telephone integration (CTI) and wireless applications (e.g., local loop replacement (i.e., mixed wired and wireless), PCS/Cellular and mixed wireless technologies within the same switch). The distributed architecture and aggregate call processing capacity of the switching platform exceeds the processing capacity of centralized systems. Since resources tend to expand linearly with increased port utilization, the switching platform provides high call set-up capacity at various sizes (e.g., the call set-up capacity exceeds 500,000 busy hour call attempts (BHCA)).

Time division multiplexed (TDM) data buses 7A and 7B are utilized to transfer data (e.g., voice and other information) between various circuit cards disposed on a shelf midplane within a group as described above. Each circuit card that interfaces data buses 7A and 7B includes data bus access circuitry enabling that circuit card to transmit onto the data buses during assigned time slots, and receive information during any time slot. For example, switch cards 2 include TDM transmit and receive circuit 14, TDM access circuits 21 and transceivers 20 that enable the switch cards to access data buses 7A and 7B, while data communications cards 4 similarly include TDM transmit and receive circuit 45, TDM access circuits 50 and transceivers 49 to enable the data communications cards to access the data buses. The data bus access circuitry for each card accessing data buses 7A and 7B is substantially similar and functions in substantially the same manner to provide these cards access to the data buses.

A data bus access circuit enabling cards to access data buses 7A and 7B is illustrated in FIGS. 3a–3b. The data bus access circuit generally places a single time division multiplexed (TDM) sample or byte onto a portion of data bus 7A or 7B during the proper pre-assigned time slot wherein the data bus access circuit accommodates a portion of data bus 7A or 7B having a one byte (i.e., a eight bit) data line 501 and a one bit enable line 502. Enable line 502 is typically driven for half a clock cycle and is basically utilized by an expander card 6 to drive bus repeater circuit 63 (FIG. 1) in reverse direction such that information being placed on data line 501 is made available to flat cables extending to other shelves within a group. In other words, a shelf containing a circuit card that is transmitting during a particular time slot enables bus repeater circuit 63 to drive the buses of other shelves within a group such that each shelf bus within a group contains substantially the same information as described below. Since each data bus 7A and 7B is two bytes wide as described above, two access circuits are required for each data bus 7A and 7B. Thus, each circuit card accessing the data buses includes four data bus access circuits to access data buses 7A and 7B. Access to each portion of data buses 7A, 7B is accomplished in substantially the same manner described below. Data buses 7A and 7B accommodate 8,000 samples per second, or one sample each 125 microsecond period or frame wherein each 125 microsecond period typically includes 4,096 time slots evenly distributed among the data buses. In other words, each data bus 7A, 7B includes 2,048 time slots, wherein each of the four access circuits disposed on a circuit card is associated with one byte or half of a data bus, and therefore, manages 1,024 time slots (i.e., half of 2,048 time slots associated with each bus 7A, 7B). Each data bus portion time slot endures for approximately 122 nanoseconds (i.e., 125 microseconds divided by 1,024 time slots) wherein only one card within a group is permitted to transmit during a time slot onto the portion of data bus 7A or 7B associated with a data bus access circuit. In other words, each data bus access circuit permits only one card within a group to transmit information onto its associated data bus portion within a time slot, but the same or different cards may transmit information simultaneously during a time slot onto the different data bus portions associated with the different data bus access circuits (i.e., the 4,096 time slots may be considered to be four parallel sets of 1,024 time slots on independent buses). The data bus access circuit basically controls when a particular card transmits onto a data bus, and receives information during all time slots on the data buses except for the time slots during which the particular card transmits information. Thus, switch cards 2 or data communications cards 4 may transmit on data buses 7A, 7B only during their preassigned time slots, but receive information during the remaining time slots. Application processors 12, 42 on respective switch and data communications cards 2, 4, each typically select a time slot from the assigned time slots for their cards in order to transmit information onto data buses 7A, 7B. The time slot to utilize may be selected from the assigned time slots in any manner.

A data bus access circuit initially includes connectors 500 to connect various portions of the data bus access circuit to the data buses wherein connectors 500 essentially connect a circuit card to midplane 1. Specifically, a transceiver 503 is connected between data line 501 and the data input of a receive RAM 510. Transceiver 503 is typically controlled by a TX-signal described below that biases transceiver 503 to receive data (i.e., when the TX-signal is high) from data line 501 and place the data into receive RAM 510, typically having the capacity to store one byte of data for each time slot within two frames (i.e., two 1,024 time slot frames or at least 2,048 memory locations) as described below. Thus, during each 122 nanosecond time slot, a byte (i.e., eight bits) of data is received from data line 501 and placed in receive RAM 510 (i.e., unless the particular card is transmitting). Receive RAM 510 is addressed by a ten-bit counter 514 (i.e., addressing a maximum of $2^{10}$ or 1,024 memory locations) having the counter output connected to an address input of the receive RAM. Counter 514 is clocked during each 122 nanosecond period or time slot, and reset at the end of each 125 microsecond frame by a FRAME SYNC signal. The FRAME SYNC signal is generated by a single divider or other circuit that divides the switching platform master clock of 8.192 MHz by 1,024 time slots to attain an 8 KHz rate that produces a one bit wide pulse each 125 microsecond period or frame. Alternatively, other circuitry may be employed to generate the FRAME SYNC signal at other appropriate times for particular applications. The FRAME SYNC signal is distributed via clock distribution lines 8A, 8B (i.e., typically having additional lines to distribute the FRAME SYNC signal) to enable the signal to be available to the circuit cards at substantially the same time in a manner similar to that described above. Manipulation of counter 514 in this fashion ensures that data from each time slot on data line 501 is stored in a memory location within RAM 510 that corresponds to that time slot. In other words, an entire frame of data including 1,024 time slots is stored in 1,024 consecutive memory locations within RAM 510, wherein the first time slot is stored in the first memory location, the last time slot is stored in the one-thousand twenty-fourth location, while the remaining time slots within a frame are stored in the memory location within RAM 510 corresponding to that time slot (i.e., the second through one thousand twenty-third time slots). A flip-flop 511 has its non-inverting output connected to the most significant bit of the receive RAM address input, while the flip-flop inverting output is connected to the flip-flop input. Flip-flop 511 is clocked by the FRAME SYNC signal at the end of each frame, thereby causing the flip-flop to receive its inverted state or toggle (i.e., alternate states) each frame. The most significant bit of the receive RAM address input is toggled each frame by flip-flop 511, thereby causing succeeding frames to be stored in two separate areas within receive RAM 510. This enables receive RAM 510 to store two frames of data and provide data from a current or previous frame for examination. Thus, while previous frame data is being retrieved from receive RAM 510, current frame data from data line 501 may be stored in the receive RAM. The FRAME SYNC signal clocks flip-flop 511 at the end of each frame, thereby controlling the memory location within receive RAM 510 receiving data from data line 501. An eight-bit shift register 515 is connected to an output of receive RAM 510 to receive in parallel eight bits (i.e., one byte) of frame data stored in the receive RAM and shift the received frame data out of the register (i.e., convert the parallel data to serial data) in serial format at an appropriate rate. Receive RAM 510 may be implemented by a dual port RAM (i.e., a RAM having two address and two data ports) such that data may simultaneously be retrieved from and stored into the dual port RAM. Alternatively, simultaneous retrieval and storage of data within receive RAM 510 may be accomplished by time sharing control circuitry.

The data bus access circuit may permit transmission onto data bus line 501 only during time slots preassigned to a card by an entity, such as database/processor card 3 as described above. Database/processor card 3, for example, sends messages at system initialization or when a card is inserted within a midplane slot, to a communications processor of that card identifying time slots assigned to the card on each of the four single byte bus portions of data buses 7A and 7B. Each card that transmits onto data busses 7A and 7B receives an appropriate quantity of time slots in this fashion based on the external facilities supported by that card. The data bus access circuit further includes a transmit map RAM 505 having 1,024 one bit memory locations corresponding to each time slot for data line 501. Alternatively, when additional one byte portions of the data buses are accommodated as described above, transmit map RAM 505 includes an additional bit within each memory location corresponding to the additional data bus byte portions. For example, two bit words are utilized for two one byte data bus portions, while three bit words are utilized for three one byte data bus portions. The multiple bit words are retrieved from transmit RAM 505 and distributed to each data bus access circuit associated with a one byte portion of a particular data bus 7A or 7B (i.e., the transmit map RAM is typically common to access circuits associated with a particular data bus 7A or 7B). Transmit map RAM 505 is loaded by a card communications processor at switching platform or card initialization, wherein the transmit map RAM data remains unchanged until new time slots are assigned (i.e., the time slot allocation for the switching platform is modified). Each one bit memory location within transmit map RAM 505 contains a binary one or zero wherein a binary one within a memory location indicates that the card may transmit onto data line 501 during the time slot corresponding to that memory location.

Transmit map RAM 505 is addressed by a ten-bit counter 508 (i.e., addressing a maximum of $2^{10}$ or 1,024 memory locations) having the counter output connected to an address input of the transmit map RAM. Counter 508 is clocked by the switching platform 8.192 MHz clock (i.e., corresponding to a clock approximately every 122 nanoseconds) during each time slot, however, any clocking frequency and/or time slot period may be utilized. Counter 508 addresses transmit RAM 505 in synchronization with the time slots of data line 501, and is reset by the FRAME SYNC signal at the end of each frame as described above such that each memory location within transmit map RAM 505 coincides with, and is addressed during, a corresponding time slot. The output of transmit map RAM 505, or XMT ENABLE (i.e., transmit enable) signal, is connected to an input of a NAND gate 506. Another input of NAND gate 506 receives the switching platform clock wherein the output of the NAND gate, or EN- (i.e., enable not) signal, is connected to a driver 504 disposed between enable line 502 and NAND gate 506. Driver 504 is controlled by the TX-signal described below and is typically implemented by a tristate driver wherein the driver incudes high impedance and only drives enable line 502 in response to a low true signal. The output of transmit map RAM 505, or XMT ENABLE signal, is further connected to an inverter 507 disposed parallel to NAND gate 506 between transmit map RAM 505 and driver 504. The output of inverter 507, or the TX-signal discussed above, enables driver 504 to drive enable line 502. Further, the TX-signal also causes transceiver 503 to reverse direction and place data on data line 501. Thus, during a time slot in which a card may transmit onto data line 501, a binary one is retrieved from transmit map RAM 505, and during a clock pulse (i.e., the first half of a clock cycle) NAND gate 506 drives the EN- (i.e., enable not) signal low. Consequently, the output of inverter 507, or the TX-signal, is driven low based on the high input from transmit map RAM 505, thereby driving enable line 502 low for half a clock cycle (i.e., since the output of NAND gate 506, or the EN- (i.e., enable not) signal, is low only during the output of the clock pulse occurring at the first half of a clock period), and causing transceiver 503 to place data on data line 501 for a full clock cycle. When a binary zero is retrieved from transmit map RAM 505, inverter 507 drives the TX-signal high, thereby biasing transceiver 503 to the receive state, and preventing driver 504 from placing signals onto enable line 502.

Transceiver 503 is further connected to an output of a transmit RAM 509 that stores data received from other devices for placement on data bus line 501. Transmit RAM 509 may be implemented by dual port RAM wherein an entirely separate address bus is utilized to store data into the transmit RAM. Alternatively, transmit RAM 509 may include time sharing circuitry as described above to enable simultaneous retrieval and storage of data. By way of example, transmit RAM 509 includes 256 memory locations or bytes of data for transmission of one byte onto data line 501 during each assigned time slot (i.e., the transmit RAM stores data for transmission onto data line 501 during each of a maximum of 256 succeeding occurrences of assigned time slots). Transmit RAM 509 is addressed by an eight-bit counter 513 (i.e., addressing a maximum of 28 or 256 memory locations) having the counter output connected to an address input of the transmit RAM, and an enable input connected to the output of transmit map RAM 505 (i.e., the counter is enabled by the XMT ENABLE signal). Counter 513 is clocked by the switching platform clock, and enabled when the output of transmit map RAM 505 is a binary one, or the XMT ENABLE signal is high, indicating that the card may transmit during the current time slot. At the end of each clock cycle during which a card is transmitting onto data line 501, counter 513 advances to address the next memory location within transmit RAM 509. In other words, when the output of transmit map RAM 505 is a binary one, or the XMT ENABLE signal is high, data present on the output of transmit RAM 509 is placed on data bus line 501, and counter 513 increments on the next clock cycle to address the next byte of data for transmission onto data line 501. In this fashion, transmit RAM 509 may be loaded with several bytes of data for transmission onto data line 501 during each time slot, and transmitting that data onto the data line only during the assigned time slots. The output of flip-flop 511 is connected to the most significant bit of the transmit RAM address input as described above for receive RAM 510 such that frame data for data line 501 is stored and retrieved in separate locations for succeeding (i.e., the current and next frames) frames. Data placed on data line 501 is also stored in receive RAM 510 since transmit RAM 509, and receive RAM 510 are connected to the same path interfacing data line 501. This data stored in receive RAM 510 from transmit RAM 509 is of no consequence and does not alter operation of the circuit. An eight-bit shift register 512 is connected to an input of transmit RAM 509 and receives data (i.e., XMT DATA) from various facilities for placement onto data line 501. Shift register 512 receives data in serial format and converts that data into an eight bit parallel format for transfer to transmit RAM 509 under control of memory control circuitry (e.g., direct memory access). Data is placed in transmit RAM 509 such that the data is transmitted onto data line 501 during the assigned time slot selected by the application processor as described above. In other words, data is sent in a serial stream to shift register 512 wherein that data is placed in transmit RAM 509 such that filler or arbitrary data is transmitted during unselected assigned time slots and actual data is transmitted during selected assigned time slots. In this fashion, data is stored in transmit RAM 509 to coincide with, and be transmitted during, the selected assigned time slots. The data bus access circuitry is typically implemented by conventional and/or commercially available components, and may be designed in various manners such that only one card is permitted to transmit onto the data bus during a time slot, and each card receives information from the data bus during the remaining time slots. The data bus access circuits for each card are preferably implemented by an Altera 10K10 field programmable gate array (FPGA) wherein the drivers and transmit and receive RAMs are external to the gate array. Alternatively, the circuitry may be implemented as an application specific integrated circuit (ASIC).

Operation of the data bus access circuit is now described with reference to the exemplary circuit and timing diagram illustrated in FIGS. 3a–3b. The exemplary timing diagram is based on a particular card transmitting during the three-hundred twenty-seventh and three-hundred twenty-eighth time slots, and a continuous clock having a frequency of approximately the duration of a time slot (i.e., 8.192 MHz) as described above. Transmit map RAM 505 typically receives assigned time slots from the communications processor on that card and contains a binary one at the three-hundred twenty-seventh and three-hundred twenty-eighth memory locations within the transmit map RAM to enable transmission during those assigned time slots. The remaining memory locations within transmit map RAM 505 contain a binary zero. Transmit map RAM 505 and receive RAM 510 are addressed by counters 508, 514, respectively, that are incremented each time slot as described above. Counters 508, 514 cycle through memory locations within RAMs 505, 510 each frame to indicate whether or not the card may transmit during a particular time slot, and store data for each time slot, respectively, as described above. Similarly, transmit RAM 509 is addressed by counter 513 that is incremented only at the end of time slots in which the card is permitted to transmit such that data is placed on data line 501 in sequential order from the transmit RAM during each succeeding assigned time slot. Counters 508, 513 and 514 are each reset at the end of a frame by the FRAME SYNC signal in order to cycle through the time slots and data addresses for succeeding frames as described above. Data in transmit and receive RAMS 509, 510 are stored in and retrieved from two different locations in order to contain data for two frames. The memory locations are determined by flip-flop 511 toggling the most significant bit of the address inputs of RAMS 509, 510 as described above. The FRAME SYNC pulse further toggles flip-flop 511 as described above such that the storage sections within the transmit and receive RAMs alternate for each frame.

During circuit operation, counter 508 cycles through the memory locations within transmit map RAM 505 each frame. When a non-assigned time slot occurs (i.e., all but the three-hundred twenty-seventh and three-hundred twenty-eighth time slots), a binary zero is retrieved from transmit map RAM 505 wherein the binary zero is placed onto the output of the transmit map RAM, or in other words, the XMT ENABLE signal is low. When the XMT ENABLE signal is low, inverter 507 produces a high output signal, or the TX-signal is high. Since driver 504 is low enabled (i.e., transmits upon a low enable signal) and is controlled by the TX-signal, and since transceiver 503 is low enabled for a transmit state (i.e., enters a transmit state upon a low enable signal), the high TX-signal prevents driver 504 from driving enable line 502, and biases transceiver 503 to be in a receive state. In addition, the low XMT ENABLE signal ensures that the output of NAND gate 506, or the EN- (i.e., enable not) signal is high, thereby further preventing enable line 502 from being driven low (i.e., even if driver 504 is somehow enabled) and affecting bus repeater circuit 63 as described below. Thus, data is received from data bus line 501 and placed in receive RAM 510 at the address indicated by the combination of bits from flip-flop 511 and counter 514 as described above. Data may be retrieved in parallel from receive RAM 510 by shift register 515 for serial output to external devices.

During the three-hundred twenty-seventh time slot, a binary one is retrieved from transmit map RAM 505 and placed onto the output of the transmit map RAM, or in other words, the XMT ENABLE signal is high. When the XMT ENABLE signal is high, NAND gate 506 produces an EN-signal based on the switching platform clock that is low only during the clock pulse (i.e., the first half of a clock cycle since the XMT ENABLE and clock pulse are both high only during the first half of a clock cycle). The XMT ENABLE signal is also inverted by inverter 507 to produce a low output signal, or in other words, a low TX-signal. Since the switching platform clock signal is a pulse train that is high during the first half of a full clock period, the EN- signal is low during the first half of a clock cycle and high during the second half of a clock cycle. The low TX-signal enables driver 504 to drive enable line 502 low during the first half of a clock cycle, and high during the second half of the clock cycle in accordance with the EN-signal. This ensures that enable line 502 is properly returned to a high state in a timely fashion prior to disabling driver 504, via a high TX-signal, to prevent the enable line from incorrectly driving bus repeater circuit 63 by floating back slowly to a high state due to other switching platform circuitry that pulled up that line. The low TX-signal further causes transceiver 503 to reverse direction and enter a transmit state to place data on data line 501. Data is retrieved from transmit RAM 509 based on the address indicated by the combination of bits from flip-flop 511 and counter 513 as described above. Data may be placed in transmit RAM 509 in parallel via shift register 512 receiving serial data from external devices, and memory control circuitry, such as direct memory access, as described above. Counter 513 is subsequently incremented to address the next memory location in transmit RAM 509 containing data for transmission during the next assigned time slot. The circuit operates in substantially the same manner described above during the three-hundred twenty-eighth time slot to transfer the next byte of information from transmit RAM 509 to data line 501.

Messages between circuit cards are sent via message buses 9A and 9B. Each circuit card that interfaces message buses 9A and 9B typically includes message access circuitry that collectively enables only one card within a group to transmit a message onto each message bus 9A and 9B at any one time, similar to a token passing mechanism, thereby avoiding bus access collisions. For example, switch card 2 includes message access circuitry 19 and transceivers 18, database/processor cards 3 include message access circuitry 34 and transceivers 36, while data communications card 4 includes message access circuitry 47 and transceivers 48. The message access circuitry for each card accessing message buses 9A and 9B is substantially similar, and functions in substantially the same manner described below to collectively permit one card within a group access to the message bus at any one time. In other words, message bus 9A may receive a message from only one card within a group at any one time, while message bus 9B may similarly receive a message from only one card (i.e., the same or different card transmitting onto message bus 9A) within a group at any one time wherein the cards may transmit messages onto separate message buses 9A, 9B simultaneously. An exemplary message access circuit that enables access to message buses 9A and 9B is illustrated in FIGS. 4a–4b. A message bus, either 9A or 9B, includes a one bit message data line 601, a one bit message hold line 602, a one bit message enable line 603 and a one bit message sync line 604. Message enable line 603 is utilized to control direction of transfer within bus repeater circuit 63 for the message lines in substantially the same manner described above for enable line 502 (FIG. 3a). Since midplane 1 contains two message buses 9A and 9B as described above, each circuit card accessing the message buses includes two message access circuits wherein each message access circuit is associated with one message bus. A message access circuit initially includes connectors 600 that connect various portions of the message access circuit to message lines 601–604 wherein connectors 600 essentially connect a circuit card to midplane 1. Specifically, a message access circuit includes a counter 609 that is clocked by the switching platform clock (i.e., the 8.192 MHz clock described above) and counts each switching platform clock cycle. The count accumulated by counter 609 corresponds to an identification number associated with a circuit card within a group that is permitted to transmit a message onto message data line 601. Message sync line 604 is usually driven low by a master counter, typically residing on an expander card 6 (FIG. 1) described below, each time that master counter cycles through the card identification numbers of each card within a group. A master counter is associated with each message bus 9A and 9B wherein each master counter cycles through card identification numbers of each card within a group in substantially the same manner as counter 609. The master counter outputs a sync pulse onto message sync line 604 after cycling through the card identification numbers of each circuit card within a group. Further, the master counter and message access circuits associated with message bus 9A are typically configured to count in a direction opposite to the count direction of the corresponding master counter and message access circuits associated with message bus 9B. For example, the master counter and message access circuits associated with message bus 9A may be configured to start at the first card identification number and count through the last card identification number, while the master counter and message access circuits associated with message bus 9B may be configured to start at the last card identification number and count through the first card identification number. This counting scheme ensures that two message busses always permit any card to have an opportunity to transmit on the message bus in the event of serious hardware failures. Counter 609 includes a reset input that is low enabled (i.e., resets the counter upon a low enable signal) and receives a signal from message sync line 604, or the SYNC-signal, via a bus receiver 608 connected between counter 609 and the message sync line. The SYNC-signal resets counter 609 subsequent to counter 609 (i.e., being coincident with a master counter) cycling through the identification numbers of each circuit card within a group. This sync signal, distributed to all message access circuits, assures that all such circuits are synchronized.

Counter 609 further includes an enable input that receives a signal from message hold line 602, or the HOLD- signal, via a transceiver 606 connected between counter 609 and the message hold line. Transceiver 606 is low enabled to a transmit state (i.e., the transceiver transmits upon a low enable signal) wherein the transceiver is controlled by a TX-signal described below that generally biases the transceiver to a receive state. Message hold line 602 is typically driven low by a circuit card that is transmitting a message onto message data line 601, and is returned to a high state by that transmitting card upon completion of the transmission. When message hold line 602 is low, counter 609 is disabled since the message hold line is connected to the enable input of the counter as described above. Thus, counter 609 (i.e., and all other message access circuitry counters associated with message data line 601) cycles through card identification numbers when no circuit card is transmitting a message onto message data line 601, and is prevented from cycling through the card identification numbers when a card is transmitting a message onto message data line 601. This arrangement enables each circuit card within a group an opportunity to transmit an entire message onto message data line 601 in sequential order based on their card identification numbers, and ensures that counters 609 of each message access circuit associated with message data line 601 maintains substantially the same count.

The output of counter 609 is connected to an input of a comparator 610 that compares the count to a card identification number received at a second comparator input. The card identification number includes an electrical shelf number and card slot number that is retrieved by each circuit card from their physical midplane card slot. The shelf and card slot number are combined to provide a card identification number unique to each circuit card wherein different cards may be inserted into various midplane slots as described above and ascertain their identification numbers from those midplane slots. Counter 609 functions essentially as a distributive polling mechanism wherein the count of counter 609 indicates the card identification number of the circuit card permitted to transmit a message onto message data line 601. Comparator 610 compares the count received from counter 609 with a particular card identification number (i.e., the card identification number of the circuit card containing that message access circuit) wherein when the count equals that card identification number, the circuit card is permitted to transmit a message onto message data line 601. Typically, comparator 610 produces a high signal on its EQ output when the count equals the card identification number, and produces a low signal on the EQ output when the count does not equal the card identification number. When the card does not have a message to transmit, counter 609 continues to cycle through the identification numbers of other circuit cards wherein those other cards are provided an opportunity to transmit a message onto data message line 601. Counter 609 cycles through card identification numbers in this fashion, unless a circuit card is currently transmitting a message onto message data line 601 as described above.

A universal synchronous receiver transmitter (USRT) 616, preferably a Siemens 82532 integrated circuit compatible with a high level data link control (HDLC) protocol and having a sixty-four byte buffer, is clocked by the switching platform clock and is connected to message data line 601 via a transceiver 605 disposed between receiver/transmitter 616 and message data line 601. Transceiver 605 is low enabled to a transmit state (i.e., the transceiver transmits upon a low enable signal) and is controlled by the TX-signal described below that generally biases transceiver 605 to receive data from message data line 601. Receiver/transmitter 616 corresponds to one-half of serial ports 17 of switching card 2 (e.g., one-half of serial ports 35 of database/processor card 3, or one-half of serial ports 46 of data communications card 4) and is frequently implemented as a dual receiver/transmitter. Receiver/transmitter 616 receives and transmits data to message data line 601 via a single wire configured for half duplex transmission wherein the communications processor typically loads a message into receiver/transmitter 616 for transmission onto message data line 601. Receiver/transmitter 616 is connected to an input of a flip-flop 611 wherein receiver/transmitter 616 sends a request to send (RTS) signal to flip-flop 611 indicating that a message has been loaded within the receiver/transmitter for transmission onto message data line 601. Flip-flop 611 is clocked by the switching platform clock wherein the request to send (RTS) signal is latched into flip-flop 611 during the rising edge of the next switching platform clock. The request to send (RTS) signal may be sent prior to counter 609 reaching the particular card identification number, or in other words, prior to that card's opportunity for transmission onto message data line 601.

The non-inverting output of flip-flop 611 is connected to an input of an AND gate 612, while an output signal from comparator 610 indicating whether or not counter 609 has reached the card identification number is directed to a second input of AND gate 612. The output of AND gate 612, or clear to send (CTS) signal, indicates whether or not receiver/transmitter 616 may transmit a loaded message onto message data line 601. The clear to send (CTS) signal is directed back to an input of receiver/transmitter 616 from the output of AND gate 612. When the clear to send signal (CTS) is high (i.e., the output of comparator 610 is high indicating the card identification number has been reached, and the request to send (RTS) signal from flip-flop 611 is also high indicating that a message has been loaded into receiver/transmitter 616), receiver/transmitter 616 begins to transmit a loaded message through transceiver 605 to message data line 601 at the beginning of the next switching platform clock cycle. However, if the output of comparator 610 is low (i.e., the count does not match the card identification number), or receiver/transmitter 616 does not contain a loaded message as indicated by a low request to send (RTS) signal at the non-inverting output of flip-flop 611, AND gate 612 generates a low output, or the clear to send (CTS) signal is low, indicating to receiver/transmitter 616 that it is not permitted to transmit onto message data line 601. The output of AND gate 612, or the clear to send (CTS) signal, is connected to an input of a NAND gate 613, while the switching platform clock is directed to a second input of NAND gate 613 to produce an EN- (i.e., enable not) signal. When the clear to send (CTS) signal is high indicating that receiver/transmitter 616 is permitted to transmit a loaded message, the output of NAND gate 613, or the EN- signal, is driven low for the first half of a clock cycle (i.e., since the switching platform clock and the clear to send (CTS) signal are high during the first half of a clock cycle, thereby driving the output of NAND gate 613, or the EN- signal, low for the first half of a clock cycle) in substantially the same manner, and for substantially the same reasons as described above for enable line 502 of the data bus access circuit (FIG. 3a). The EN- signal is placed on message enable line 603 via a driver 607 connected between NAND gate 613 and message enable line 602. Driver 607 is low enabled (i.e., enabled by a low signal) and controlled by the TX-signal described below.

The request to send (RTS) signal from receiver/transmitter 616 is connected to an an inverting tristate driver 614 that is low enabled (i.e., enabled by a low signal) and controlled by the TX-signal described below. Driver 614 is connected between transceiver 606 and the request to send (RTS) signal line extending from receiver/transmitter 616 to flip-flop 611. The output of AND gate 612, or the clear to send (CTS) signal is connected to inverter 615 wherein the output of inverter 615, or the TX-signal, is utilized to control transceivers 605, 606, inverting tristate driver 614 and tristate driver 607 as described above. In other words, when the clear to send (CTS) signal is high indicating that receiver/transmitter 616 is permitted to transmit a loaded message, the output of inverter 615, or the TX-signal, is low, thereby biasing transceivers 605, 606 to a transmit state to drive the message data and hold lines 601, 602 respectively, and enabling driver 607 to drive message enable line 603. Subsequently, receiver/transmitter 616 transmits serial data through transceiver 605 to message data line 601, while inverting driver 614 inverts the request to send (RTS) signal and places that inverted signal, or the HOLD-signal (e.g., a low signal since the request to send (RTS) signal is high), via transceiver 606, onto message hold line 602 to indicate that a card is transmitting, and to prevent message access circuitry associated with message data line 601 from cycling through the card identification numbers as described above. Counter 609 in this circuit is also prevented from cycling. The output of NAND gate 613, or the EN-signal, is similarly placed on message enable line 603 via tristate driver 607 such that the message enable line 603 is driven low by the EN-signal for the first half of a clock as described above. However, when the clear to send (CTS) signal is low indicating that receiver/transmitter 616 is not permitted to transmit onto message data line 601, the output of inverter 615, or the TX-signal is high, thereby biasing transceivers 605, 606 to a receive state, and disabling driver 607 such that the card may not transmit onto the message data, hold and enable lines 601–603, respectively.

After receiver/transmitter 616 has transmitted all bytes within a loaded message when granted access to message data line 601, the receiver/transmitter lowers the request to send (RTS) signal such that inverting tristate driver 614 produces a high signal, or the HOLD-signal is high, that indicates the card is no longer transmitting and enables message access circuits associated with message data line 601 to resume cycling through card identification numbers at the next switching platform clock cycle. Counter 609 typically increments to a subsequent card identification number in response to a high HOLD-signal, and since the count does not equal the card's identification number, comparator 610 produces a low signal on the EQ output that causes AND gate 612 to generate a low clear to send (CTS) signal. The low clear to send (CTS) signal indicates to receiver/transmitter 616 that it is not permitted to transmit. Moreover, inverter 615 produces a high TX-signal, based on a low clear to send (CTS) signal at its input, that returns transceivers 605, 606 to a receive state, and disables inverting tristate driver 614 and driver 607 such that the message access circuit may not drive the respective message data, hold and enable lines 601–603 (i.e., the card is not permitted to transmit). The low clear to send (CTS) signal further generates a high EN-signal via NAND gate 613 such that the EN-signal is no longer pulsed at the first half of each clock cycle. The low request to send (RTS) signal is latched into flip-flop 611 to drive the non-inverting flip-flop output to a low state on the next clock cycle. The low request to send (RTS) signal indicates that a message is not loaded within receiver/transmitter 616 as described above, and maintains generation of a low clear to send (CTS) signal via AND gate 612. Thus, the message access circuit is ready to receive messages from the respective message lines 601–604 until the count within counter 609 reaches that card's identification number, thereby providing another opportunity to transmit a message onto message data line 601. The message access circuitry is typically implemented by conventional and/or commercially available components, and may be designed in various manners such that only one card is given an opportunity to transmit onto a message bus at any one time. The message access circuits for each card are preferably implemented by an Altera 10K10 field programmable gate array (FPGA) wherein the drivers and receiver/transmitter are external to the gate array. Alternatively, the circuitry may be implemented as an application specific integrated circuit (ASIC).

Operation of an exemplary message access circuit is now described with reference to FIGS. 4a–4b. Specifically, counter 609 counts switching platform clocks and cycles through card identification numbers of each card within a group when message data line 601 is not receiving a message from a card within the group as indicated by message hold line 602, or the HOLD-signal, in a high state as described above. In response to message hold line 602, or the HOLD-signal, entering a low state indicating that a card within a group is transmitting onto message data line 601, counter 609 ceases operation until message hold line 602, or the HOLD-signal, returns to a high state indicating completion of the transmission. When the count does not equal that card's identification number as determined by comparator 610 described above, or a message is not loaded within receiver/transmitter 616, the circuit is configured to receive information from respective message data, hold, enable and sync lines 601–604. Comparator 610 generates a low signal when the count does not match the card identification number, thereby causing AND gate 612 to generate a low output, or low clear to send (CTS) signal. Further, when no message is loaded within receiver transmitter 616, or the request to send (RTS) signal is low, AND gate 612 generates a low output or low clear to send (CTS) signal. The low clear to send (CTS) signal is inverted by inverter 615 to produce a high output, or a high TX-signal. Since transceivers 605, 606 are low enabled for a transmit state as described above, the high TX-signal biases transceivers 605, 606 to a receive state. Similarly, since driver 607 is low enabled, the high TX-signal disables driver 607 and prevents placement of the EN-signal onto message enable line 602. Thus, when the count does not equal the card identification number (i.e., another card may be transmitting onto message data line 601), or receiver/transmitter 616 does not contain a loaded message (i.e., although the count may equal the card identification number), the message access circuit biases transceivers 605, 606 to a receive state, and disables driver 607 to prevent transmission and enable reception of information. Receiver/transmitter 616 subsequently receives messages from message data line 601 and stores the message for transference to the communication processor for processing. Receiver/transmitter 616 utilizes direct memory access (DMA) to place messages into RAM or other device (e.g., the RAM of the communications processor) when a message is addressed to a card's identification number, or the message is broadcast to a card type matching the particular card characteristics (i.e., referred to as multicast).

When the communications processor desires to send a message, that message is loaded into receiver/transmitter 616 wherein receiver/transmitter 616 drives the request to send (RTS) signal high. The request to send (RTS) signal should be driven high at least one clock period before the count within counter 609 equals the card identification number to ensure transmission during the subsequent clock cycle. The request to send signal (RTS) is subsequently latched into flip-flop 611, and when counter 609 reaches the card identification number, comparator 610 generates a high signal on the EQ output, that, when combined with the high request to send (RTS) signal from the non-inverting output of flip-flop 611, enables AND gate 612 to generate a high clear to send (CTS) signal. The high clear to send (CTS) signal indicates to receiver/transmitter 616 that it is permitted to transmit the loaded message at the next clock cycle. The high clear to send (CTS) signal is inverted by inverter 615 to generate a low output, or a low TX-signal, that biases transceivers 605, 606 to a transmit state to place data on message data and hold lines 601, 602, respectively. The low TX-signal enables inverting tristate driver 614 to invert the high clear to send (CTS) signal to produce a low output, or a low HOLD-signal, and drive message hold line 602 low, via transceiver 606, to prevent message access circuits from cycling through card identification numbers during that card's transmission as described above. Counter 609 in this circuit is also inhibited from counting. The switching platform clock and the high clear to send (CTS) signal are utilized by NAND gate 613 to produce a low output, or low EN-signal during the first half of a clock cycle (i.e., since the clock is high for the first half of the clock cycle and the clear to send (CTS) signal is high for the full clock cycle wherein a low signal is produced when both NAND gate inputs are high). The low TX-signal further enables driver 607 to drive message enable line 603 low during the first half of a clock cycle in accordance with the EN-signal in order to control repeater circuits 63 (FIG. 5a) and enable all shelf buses within a group to contain substantially the same information as described above. Receiver/transmitter 616 transmits an entire message onto message data line 601, via transceiver 605, and substantially lowers the request to send signal (RTS). Inverting driver 614 subsequently produces a high output, or high HOLD-signal, based on the low request to send (RTS) signal thereby raising message hold line 602 to a high state and enabling the message access circuits to resume cycling through card identification numbers. Counter 609 subsequently increments to the next card identification number such that comparator 610 generates a low signal on the EQ output since the count no longer equals the card identification number. When the request to send (RTS) signal (i.e., if a new message has not been loaded) or the comparator EQ output is low, AND gate 612 produces a low output, or a low clear to send (CTS) signal, that causes inverter 615 to generate a high output, or a high TX-signal, thereby biasing transceivers 605, 606 to a receive state and disabling inverting tristate driver 614 and driver 607. Thus, the message access circuit is basically restored to a configuration for receiving messages. A master counter, typically residing on an expander card 6, produces a sync pulse on sync line 604 that resets counter 609 as described above, and synchronizes each message access circuit associated with a particular message bus (i.e., synchronizes the message access circuit counters to count card identification numbers in substantially the same fashion). The sync pulse enables counter 609 to repeatedly cycle through the card identification numbers or, in other words, count in a modulus fashion. The respective message data, hold, enable and sync lines 601–604 are generally pulled to high condition by the switching platform when no circuit cards are driving them, thereby forcing the circuit cards to drive them low as described above.

Several shelves may be employed by the switching platform within a group wherein data buses 7A, 7B and message buses 9A, 9B of each shelf within a group respectively require substantially the same information (i.e., data buses 7A, 7B of each shelf should respectively contain the same information, while message buses 9A, 9B of each shelf should also respectively contain the same information) to enable only one card at a time within a group to transmit onto the various midplane buses as described above. An exemplary bus repeater circuit 63 of expander card 6 (FIG. 1) for ensuring information integrity on the various midplane buses within a group is illustrated in FIGS. 5a–5b. Typically, a bus repeater circuit 63 is associated with one data bus and one message bus wherein two expander cards are disposed on each shelf to accommodate each of the shelf data buses 7A, 7B and message buses 9A, 9B. Bus repeater circuit 63 may accommodate several one byte portions of data buses 7A, 7B combining to provide the appropriate quantity of time slots (e.g., 4,096, 6,144 etc.) as described above, however, a single one byte portion of a data bus is utilized for illustrative purposes. It is to be understood that bus repeater circuit 63 may accommodate additional data bus portions in substantially the same manner described below. Bus repeater circuit 63 drives signals from the midplane of a particular shelf within a group onto a flat cable or other physical bus that interconnects expander cards 6 disposed on different group shelves. A switching platform group may contain a maximum of eight shelves, based generally on propagation delay, but in other implementations additional shelves may be incorporated into a group to enlarge platform capacity. Generally, a repeater circuit 63 receives information from vertical busses (e.g., flat cables) extending from other group shelves and places that information onto its shelf midplane buses. However, when a circuit card on a particular shelf transmits onto a data or message bus, that circuit card drives low enable signals onto the data and message buses for the first half of the clock cycle as described above wherein bus repeater circuit 63 in response to detecting the low enable signals, drives the appropriate vertical buses (i.e., the vertical TDM data line, message data line, and message hold line) with information from its corresponding midplane buses for an entire clock cycle. The data and message enable lines 502, 602 are driven low at appropriate times for only a half clock cycle such that these signals may be restored to a high state rapidly during the second half of the clock cycle. If either enable signal does not timely return to a high state, that enable signal may be interpreted low for the subsequent clock cycle and cause confusion.

A bus repeater circuit 63 handles both a data bus 7A or 7B and a message bus 9A or 9B, respectively, as described above. A data bus includes a one byte (i.e. eight bit) data line 501, and a one bit enable line 502 as described above. Repeater circuit 63 may interface further data bus portions in substantially the same manner described below to accommodate, an entire data bus 7A or 7B. A message bus 9A or 9B includes a one bit message data line 601, a one bit message hold line 602, a one bit message enable line 603, and a one bit message sync line 604 as described above. A bus repeater circuit initially includes connectors 700 that connect various portions of the bus repeater circuit to the data and message lines wherein connectors 700 essentially connect expander card 6 to midplane 1. Similarly, connectors 713 connect the vertical bus lines (e.g., flat cables) to expander card 6. Specifically, bus repeater circuit 63 includes a transceiver 701 connected between data line 501 and the vertical TDM data line wherein transceiver 701 is low enabled (i.e., enabled to reverse direction upon a low signal) and controlled by a TDM TX-signal described below that generally biases transceiver 701 to transfer data from the vertical TDM data line to data line 501. Similarly, transceiver 704 is connected between message data line 601 and the vertical message data line, while transceiver 705 is connected between message hold line 602 and the vertical message hold line. Transceivers 704, 705 are each low enabled (i.e., enabled to reverse direction upon a low signal) and controlled by a MSG TX-signal described below that generally biases transceivers 704, 705 to transfer data from the vertical message data and hold lines to the message data and hold lines 601, 602, respectively. Enable line 502 is connected to an input of flip-flop 710 via an inverting receiver 702 connected between flip-flop 710 and enable line 502. Inverting receiver 702 inverts the signal on enable line 502 and latches, at each inverted clock or second half of a clock cycle, that inverted enable line signal into flip-flop 710. The inverted enable line signal from inverting receiver 702 is further connected to an input of a NOR gate 707, while the non-inverting output of flip-flop 710 is connected to a second input of NOR gate 707 to generate an output, or a TDM TX-signal, that controls a transceiver 701. When enable line 502 is driven low by a transmitting circuit card as described above, bus repeater circuit 63 drives other shelf data buses within a group with information to enable shelf data buses within a group to contain substantially the same information. Thus, when enable line 502 is driven low for half a clock cycle as described above, inverting driver 702 inverts the low enable signal to produce a high signal, and directs that high signal to NOR gate 707 and flip-flop 710. Since flip-flop 710 is clocked by an inverted clock signal, the high signal is latched into flip-flop 710 during the second half of a clock cycle. NOR gate 707 generates a low output signal, or a low TDM TX-signal, from that high inverted enable signal, thereby causing transceiver 701 to transfer data from data line 501 to the vertical TDM data line. Norgate 707 and flip-flop 710 essentially maintain the TDM TX-signal low for an entire clock cycle to enable transceiver 701 to transfer data from data line 501 to the vertical TDM data line even though enable line 502 is driven low for only the first half of a clock cycle. In effect, flip-flop 710 stores the enable line signal from the first half of a clock cycle, and makes that signal available during the second half of a clock cycle, while NOR gate 707 directly receives the enable line signal for the first half of the clock cycle. The high signal from inverting receiver 702 enables NOR gate 707 to maintain the TDM TX-signal low for that first half of the clock cycle, while the high signal from the non-inverting output of flip-flop 710 enables NOR gate 707 to maintain the TDM TX-signal low for the second half of a clock cycle when the signal from inverting driver 702 is low (i.e., the enable signal returns to a high state during the second half of a clock cycle). Since flip-flop 710 latches the inverted enable signal upon an inverted clock (i.e., the second half of a clock cycle), the flip-flop captures the inverted enable signal at the end of the first half of the clock cycle and maintains that signal through the second half of the clock cycle to keep the TDM TX-signal low via NOR gate 707 as described above. In order to prevent flip-flop 710 from maintaining the TDM TX-signal low until the next inverted clock (i.e., second half of the next clock cycle), flip-flop 710 is reset by a reset pulse at the end of each clock cycle.

Message enable line 603 is connected to an input of a flip-flop 711 via an inverting receiver 703 connected between flip-flop 711 and message enable line 603. Inverting receiver 703 inverts the signal on message enable line 603 and latches, at each inverted clock or second half of a clock cycle, that inverted message enable line signal into flip flop 711. The inverted message enable line signal from inverting receiver 703 is connected to an input of a NOR gate 708, while the non-inverting output of flip-flop 711 is connected to a second input of NOR gate 708 to generate an output, or a MSG TX-signal, that controls transceivers 704 and 705. When message enable line 602 is driven low by a transmitting circuit card as described above, bus repeater circuit 63 drives other shelf message buses within a group with information to enable shelf message buses within a group to contain substantially the same information. Thus, when enable line 602 is driven low for half a clock cycle as described above, inverting receiver 703 inverts the low message enable signal to produce a high signal, and directs that high signal to NOR gate 708 and flip-flop 711. Since flip-flop 711 is clocked by an inverted clock, the high signal is latched into flip-flop 711 during the second half of a clock cycle. NOR gate 708 generates a low signal, or a low MSG TX-signal, from that high inverted enable signal, thereby causing transceivers 704, 705 to transfer data from respective message data and hold lines 601, 602 to the corresponding vertical message data and hold lines. NOR gate 708 and flip-flop 711 essentially maintain the MSG TX-signal low for an entire clock cycle to enable transceivers 704, 705 to transfer data from respective message data and hold lines 601, 602 to the corresponding vertical message data and hold lines even though message enable line 603 is driven low only for the first half of a clock cycle. In effect, flip-flop 711 stores the message enable line signal for the first half of a clock cycle and makes that signal available to NOR gate 708 during the second half of the clock cycle, while NOR gate 708 directly receives the enable line signal for the first half of the clock cycle. The high signal from inverting receiver 703 enables NOR gate 708 to maintain the MSG TX-signal low for that first half of the clock cycle, while the high signal from the non-inverting output of flip-flop 711 enables NOR gate 708 to maintain the MSG TX-signal low for the second half of a clock cycle in substantially the same manner described above for flip-flop 710 and NOR gate 707. In order to prevent flip-flop 711 from maintaining the MSG TX-signal low until the next inverted clock (i.e., the second half of the next clock cycle), flip-flop 711 is reset by a reset pulse at the end of each clock cycle in substantially the same manner described above. A substantially similar strategy is used to repeat the low speed serial buses within message buses 9A, 9B to other shelves within a group.

A counter 712 functions as the master counter utilized to produce the sync pulse that resets counter 609 (FIG. 5*a*) (i.e., the counters of all message access circuits associated with message data line 601) at the completion of cycling through the card identification numbers of each card within a group as described above. Counter 712 counts switching platform clock cycles to cycle through the card identification numbers of each card within a group, either in ascending or descending order, until reaching a terminal count (i.e., the last card identification number) wherein counter 712 is reset to an initial value (i.e., the first or last card identification number depending upon the count direction). Message hold line 602 is connected to an enable input of counter 712 such that the counter cycles through card identification numbers when the message hold line is in a high state, and ceases operation when the message hold line is driven low by a circuit card during transmission of a message onto message data line 601. When the count within counter 712 equals the terminal count, a terminal count (TC) output of counter 712 is set high wherein an inverting driver 709, connected between message sync line 604 and the terminal count (TC) output of counter 712, generates a low signal that is placed on the vertical message sync line. This low signal is also placed on message sync line 604 via driver 706, connected between message sync line 604 and the vertical message sync line, and is distributed to all other shelves within a group via the vertical buses extending to other shelf expander cards 6. A counter 712 and corresponding inverting driver 709 are typically implemented on only two expander cards within a multi-shelf group wherein each master counter 712 is associated with one message bus 9A or 9B. The bus repeater circuitry is typically implemented by conventional and/or commercially available components, and may be designed in various manners such that the shelf buses drive vertical buses during transmission by a card on that shelf, and the vertical buses drive the shelf buses when no card on that shelf is transmitting. The bus repeater circuits within each expander card are preferably implemented by a Lattice 1016 field programmable gate array (FPGA) wherein the drivers are external to the gate array. Alternatively, the circuitry may be implemented as an application specific integrated circuit (ASIC).

Operation of a bus repeater circuit is now described with reference to FIGS. 5*a*–5*b*. Initially, transceivers 701, 704 and 705 are configured to receive information from vertical buses and place that information on corresponding data line 501, message data line 601 and message hold line 602. When no cards within a shelf are transmitting onto data line 501, enable line 502 is high, thereby causing a low signal to be latched into flip-flop 710 from inverting receiver 702. NOR gate 707 receives a low signal from both inverting receiver 702 and the non-inverting output of flip-flop 710, and generates a high output, or a high TDM TX-signal that biases transceiver 701 to transfer data from the vertical TDM data line to data line 501 as described above. However, when a circuit card within a shelf is transmitting onto data line 501, enable line 502 is driven low for half a clock cycle, thereby causing a high signal to be latched into flip-flop 710 from inverting receiver 702 during the second half of a clock cycle since flip-flop 710 is clocked by an inverted clock. NOR gate 707 receives a high signal from inverting receiver 702 for the first half of a clock cycle, while receiving the high signal from the non-inverting output of flip-flop 710 for the second half of the clock cycle to maintain the TDM TX-signal low for an entire clock cycle as described above. The low TDM TX-signal biases transceiver 701 to transfer data from data line 501 to the vertical TDM data line. Flip-flop 710 is reset via a reset pulse at the end of each clock cycle to prevent flip-flop 710 from maintaining its state beyond the current clock cycle as described above.

Similarly, when no card within a shelf is transmitting onto message data line 601, message enable line 602 is high, thereby causing a low signal to be latched into flip-flop 711 from inverting receiver 703. NOR gate 708 receives a low signal from both inverting receiver 703 and the non-inverting output of flip-flop 711, and generates a high output, or a high MSG TX-signal that biases transceivers 704, 705 to transfer data from the vertical message data and hold lines to message data and hold lines 601, 602, respectively, as described above. When a circuit card within a shelf is transmitting onto message bus line 601, message enable line 602 is driven low for the first half of a clock cycle, thereby causing a high signal to be latched into flip-flop 711 from inverting receiver 703 during the second half of the clock cycle since flip-flop 711 is clocked by an inverted clock. NOR gate 708 receives a high signal from inverting receiver 703 for the first half of a clock cycle, while receiving the high signal from the non-inverting output of flip-flop 711 for the second half of the clock cycle to maintain the MSG TX-signal low for an entire clock cycle as described above. The low MSG TX-signal biases transceivers 704, 705 to transfer data from the respective message data and hold lines 601, 602 to the corresponding vertical message data and hold lines. Flip-flop 711 is reset via a reset pulse at the end of each clock cycle to prevent flip-flop 711 from maintaining its state beyond the current clock cycle as described above.

Counter 712 is utilized to generate the sync pulse on message sync line 604 that resets counter 609 within message access circuits associated with message data line 601. Counter 712 cycles through card identification numbers of each card within a group in modulus fashion, either in ascending or descending order as described above and places a sync pulse on the vertical message sync line when the count within counter 712 equals a terminal count (i.e., the last card identification number in the sequence) as described above. The sync pulse is placed on message sync line 604 and the vertical sync line in order to be distributed to expander cards 6 on each group shelf. Counter 712 increments only while being enabled by a high signal on message hold line 602 or, in other words, only when no circuit card within the group is transmitting onto message data line 601. When message hold line 602 is driven low by a card transmitting a message onto message data line 601, counter 712 is prevented from cycling through card identification numbers such that a card may transmit its entire message onto message data line 601. Counter 712 resumes when message hold line 602 is driven to a high state by the transmitting card at the completion of the transmission as described above. In this fashion, counter 712 mimics counter 609 within message access circuits such that the message access circuit counters are synchronized by the sync pulse and maintain substantially the same count.

The application and communications processors of each circuit card typically utilize a real time operating system, such a VxWorks from Wind River Systems or pSOS from Integrated System Services. The application processor includes software that in combination with the operating system controls telephone calls to other circuit cards. The real time operating system is combined with a Q.921/Q.931 message protocol, provided by Trillium, in order to process messages across the switching platform. The protocol and operating system are typically produced as a single off-the-shelf package wherein one of ordinary skill in the art could program the application and communications processors via the operating system and protocol to function as described below. Alternatively, messages similar to those of Q.931 may be transported using Transmission Control Protocol/Internet Protocol (TCP/IP) between cards while all other operations are essentially the same.

Operation of the switching platform is now described with reference to FIGS. 1 and 6–8. Specifically, a network management station (i.e., NMS, not shown) is connected to a database/processor card 3. The network management station may be implemented by a local or remote personal computer or workstation wherein the network management station manages and stores information relating to the switching platform configuration, performs operations, administration, maintenance and provisioning (OAM&P) tasks and collects call detail records (i.e., CDR, information that is utilized for billing). These tasks may be performed by more than one computer to enhance processing. Database/processor card 3 downloads the switching platform configuration from the network management station (NMS) into its non-volatile memory during initialization (i.e., start-up). The switching platform configuration within database/processor card 3 is typically updated by the network management station (NMS) as the configuration changes. The circuit cards connected to the switching platform retrieve the switching platform configuration from database/processor card 3 as described above. The network management station (NMS) is not critical to the switching platform once the configuration information has been downloaded to into database/processor card 3 wherein a temporary failure by the network management station generally does not affect the switching platform. The switching platform may include multiple database/processor cards 3 for redundancy to enhance switch fault tolerance wherein multiple database/processor cards may separate functions such as billing from other network management station (NMS) activities.

Each card verifies its own configuration with database/processor card 3 wherein each card downloads new configuration data when that card's configuration varies as described above. A configuration change is typically transferred from the network management station (NMS) to database/processor card 3 wherein the database/processor card alters the configuration within individual cards via a plurality of Simple Network Management Protocol (SNMP) set-up operations.

Each switch card 2 includes information relating to directory numbers for each line, trunk, and other facility supported by that card. For example, line switch cards include memory that contains all directory numbers (and feature sets, if applicable) for each supported subscriber loop. Similarly, trunk switch cards include memory that contains numbering plans for each trunk connected to the trunk switch card. The numbering plans may take the form of NPA-NXX, CAC or CIC code, or a similar combination of digits. Call routing is distributed among the switch cards based on each switch card supporting particular directory numbers, number ranges or number plans.

Call detail records (CDRs) are collected and stored in a circular or other buffer on the switch card supporting the facility originating the call. Upon completion of a call, the originating switch card sends a call detail record (CDR) to database/processor card 3 wherein the database/processor card acknowledges receipt of the call detail record and the buffer containing the record within the switch card is modified to indicate that the record has been delivered. The delivered record is not overwritten in the originating switch card buffer until older delivered records have been overwritten (i.e., the oldest delivered record in the buffer gets overwritten first). This enables recovery of call detail records (CDRs) that have been delivered and subsequently lost. Database/processor card 3 maintains collected call detail records (CDRs) in a similar but larger circular or other type of buffer, and forwards those records to the network management station (NMS) or other billing data collection system. Alternatively, database/processor card 3 may initiate call detail record collection when certain conditions are present or when instructed by a network management station (NMS).

The manner in which the switching platform processes a call from a trunk to a station (e.g., telephone handset) is now described with reference to FIG. 6. Initially, a trunk is seized by an incoming telephone call wherein the calling number and called number are transferred by the telephone network via multi-frequency (MF) or dial pulse (DP) to a trunk switch card 2. Trunk switch card 2 broadcasts a set-up message (i.e., typically in accordance with the Q.921/Q.931 protocol) on the message buses containing the calling (i.e., if transferred by the network) and called numbers to other switch cards, at step a, via the communications processor and message access circuitry described above. Each switch card monitors the broadcast and a line switch card 2 that supports a subscriber with a directory number equivalent to the called number in the set-up message responds, at step b, by sending an alerting message (i.e., typically in accordance with the Q.921/Q.931 protocol) to the originating trunk switch card over the message bus, if that subscriber is idle, via communications processor and message access circuitry described above. Alternatively, trunk switch card 2 may send the set-up message to a destination card by consulting its tables described above to determine the destination card point code (e.g., card identification number or address) wherein the destination card responds by sending an alerting message as described above. The alerting message is addressed to the point code (e.g., card identification number or address) of the trunk switch card that sent the set-up message. Only one line switch card responds to the set-up message wherein that line switch card applies power ringing to the telephone station, while the trunk switch card may apply ring back tone to the trunk as required.

When a subscriber answers the call, line switch card 2 detects an off-hook condition and removes power ringing. Further, line switch card 2, at step c, sends a connect message (i.e., typically in accordance with the Q.921/Q.931 protocol) to trunk switch card 2 over the message bus as described above to indicate that the subscriber is connected to the voice channel. Line switch card 2 connects the voice path to the time division multiplexed (TDM) data buses on a switching platform midplane. Trunk switch card 2 removes any applied ring back tone, provides an answer signal to the trunk facility, and connects the voice path to the time division multiplexed (TDM) data buses on the switching platform midplane. Thus, the voice paths are connected end-to-end.

Upon call completion, the subscriber disconnects the call wherein line switch card 2 detects an on-hook condition and sends, at step d, a release message (i.e., typically in accordance with the Q.921/Q.931 protocol) over the message bus as described above to trunk switch card 2. Line switch card 2 further disconnects the voice path of the telephone station from the switching platform midplane time division multiplexed (TDM) data buses. Trunk switch card 2 responds by sending, at step e, a release complete message (i.e., typically in accordance with the Q.921/Q.931 protocol) over the message bus as described above, disconnecting the voice path from the time division multiplexed (TDM) data buses, sending a disconnect signal to the trunk facility and returning the trunk port to an idle state.

The manner in which the switching platform processes a call from a station (e.g., a telephone handset) to a trunk is now described with reference to FIG. 7. Specifically, a subscriber line connected to line switch card 2 is seized by an outgoing call. The called number is received from the subscriber via dial pulse (DP) or dual tone multi-frequency (DTMF) signals. Line switch card 2 broadcasts over the message bus via the communications processor and message access circuitry described above, at step a, a set-up message (i.e., typically in accordance with the Q.921/Q.931 protocol) containing the calling and called numbers. Each switch card monitors the broadcast, and a trunk switch card 2 that has a route to the directory number indicated in the called number of the set-up message responds, at step b, by sending a call proceeding/alerting message (i.e., typically in accordance with the Q.921/Q.931 protocol) if a trunk on trunk switch card 2 is available. Alternatively, line switch card 2 may send the set-up message to a destination card by consulting its tables described above to determine the destination card point code wherein the destination card responds by sending the call proceeding/alerting message described above. The call proceeding/alerting message is addressed to the point code of the line switch card that sent the set-up message. Trunk switch card 2 reserves a trunk port on the indicated route for a predetermined timeout period. If multiple trunk switch cards have routes to the called number destination, each trunk switch card with a route to the destination responds with a call proceeding/alerting message.

Line switch card 2 selects one of the trunk cards that responded to the set-up message by broadcasting, at step b1, a set-up acknowledge message (i.e., typically in accordance with the Q.921/Q.931 protocol) over the message bus via the communications processor and message access circuitry described above. The point code of the selected trunk card is included in the set-up acknowledge message to inform the trunk switch cards of the selection. Alternatively, the set-up acknowledge message may be sent directly to the selected trunk card. The trunk switch cards that are not selected by the line switch card release their reserved trunk ports such that the ports are available for other calls.

The selected trunk switch card responds, at step b2, by sending a call proceeding message (i.e., typically in accordance with the Q.921/Q.931 protocol) to line switch card 2. Trunk switch card 2 seizes a trunk and sends the called and calling numbers by multi-frequency (MF) or dial pulse (DP). Trunk switch card 2 further connects the trunk incoming voice path to the switching platform midplane time division multiplexed (TDM) data buses. If it is desired that the subscriber receive call progress tones from the telephone network, line switch card 2 may connect a progress tone PCM channel to the calling subscriber's line. When the called subscriber answers the call, trunk switch card 2 detects the off-hook condition by receiving answer supervision on the trunk. Trunk switch card 2, at step c, sends a connect message (i.e., typically in accordance with the Q.921/Q.931 protocol) over the message bus as described above to line switch card 2 to indicate that the called subscriber is connected to the voice channel. Line switch card 2 connects the subscriber's voice path to the switching platform midplane time division multiplexed (TDM) data buses, while trunk switch card 2 connects the two-way voice path to the switching platform midplane time division multiplexed (TDM) data buses, thereby connecting the voice paths end-to-end.

When the subscriber disconnects the call, line switch card 2 detects an on-hook condition, and sends, at step d, a release message (i.e., typically in accordance with the Q.921/Q.931 protocol) over the message bus as described above to trunk switch card 2. Line switch card 2 further disconnects the voice path of the telephone station from the switching platform midplane time division multiplexed (TDM) data buses. Trunk card 2 responds, at step e, by sending a release complete message (i.e., typically in accordance with the Q.921/Q.931 protocol) over the message bus as described above to line switch card 2 . Trunk switch card 2 further sends a disconnect signal to the trunk facility and returns the trunk port to an idle state.

The manner in which the switch processes a call from a station (e.g., telephone set) to another station is now described with reference to FIG. 8. Specifically, an originating line switch card 2 where a subscriber originates a call broadcasts, at step a, a set-up message (i.e., typically in accordance with the Q.921/Q.931 protocol) over the message bus as described above. The set-up message contains the calling and called numbers. Every switch card monitors the broadcast and a line switch card that supports a subscriber having a directory number equal to the called number within the set-up message responds, at step b, by sending an alerting message (i.e., typically in accordance with the Q.921/Q.931 protocol) if the called subscriber's telephone is idle. Alternatively, originating line switch card 2 may send the set-up message to a destination card by consulting its tables described above to determine the destination card point code wherein the destination card responds by sending an alerting message as described above. The alerting message is addressed to the point code of originating line switch card 2 that sent the set-up message. Only one line switch card responds to the set-up message, and that line switch card also applies ringing to the telephone station.

When the called subscriber answers the call, destination line switch card 2 detects an off-hook condition and removes power ringing. Destination line switch card 2, at step c, sends a connect message (i.e., typically in accordance with the Q.921/Q.931 protocol) over the message bus as described above to originating line switch card 2 to indicate that the subscriber is connected to the voice channel. Destination line switch card 2 connects the voice path to the switching platform midplane time division multiplexed (TDM) data buses. Originating line switch card 2 removes ring back tone as required, and provides an answer signal back to the trunk. Originating line switch card 2 further connects the voice path to the switching platform midplane time division multiplexed (TDM) data buses, thereby connecting the voice paths end-to-end.

When the destination subscriber disconnects the call, destination line switch card 2 detects an on-hook condition of the telephone station and sends, at step d, a release message (i.e., typically in accordance with the Q.921/Q.931 protocol) over the message bus as described above to originating line switch card 2. Destination line switch card 2 further disconnects the voice path of the telephone set from the switching platform midplane time division multiplexed TDM buses. Originating line switch card 2 responds, at step e, by sending a release complete message (i.e., typically in accordance with the Q.921/Q.931 protocol) to destination line switch card 2, and disconnects the voice path from the switching platform midplane time division multiplexed (TDM) buses. Originating line switch card 2 further sends a disconnect signal to the telephone station and returns the line port to an idle state when the originating subscriber goes on-hook.

It will be appreciated that the embodiments described above and illustrated in the drawings represent only a few of the many ways of implementing a multiple application switching platform according to the present invention.

The components of the various bus accessing and repeater circuits are all conventional or commercially available components, such as counters, flip-flops, combinatorial gates, drivers, transceivers and inverters. The application and communications processors may be implemented by any 486 or higher level (e.g., pentium) processors, or other circuitry capable of performing call and message processing as described above, and may be programmed in any manner with any computer language to perform the above described functions. The bus access and repeater circuitry may be implemented as field programmable gate arrays (FPGA) or application specific integrated circuits (ASICS). Further, the circuits may be implemented by any electrical or other components that perform the bus accessing and repeater functions described above. The counters may count in either direction and up to a maximum count corresponding to their bit capacity.

The switching platform typically includes a maximum of eight shelves (i.e., based on propagation delays), however, in other implementations additional shelves may be incorporated to accommodate the requirements of various applications. The time slots may be assigned in any fashion such that each card is given a unique set of time slots within which to transmit information onto the time division multiplexed buses. The power cards may be implemented by any power supplies or cards capable of supplying the appropriate voltages to the circuit cards.

The processors may include any real time or other operating systems, and may utilize any protocols for processing and sending messages. The cards and/or midplane slots or each shelf may be in various quantities, and may be arranged in any manner such that dedicated slots are compatible with their associated cards. Further, each circuit card may have components arranged on the card in any manner.

The time division multiplexed (TDM) data buses may include several independent buses each having an independent set of time slots to attain a desired quantity of time slots (e.g., 2,048, 4,096 or 6,144 time slots). In addition, the time division multiplexed (TDM) data buses may include several independent buses capable of transporting various quantities of information (e.g., bits, bytes etc.), and each having an independent set of time slots. The message buses may utilize high level data link control (HDLC) or various other protocols for message transference. The microcomputers may be implemented by any conventional or commercially available processors or other circuitry capable of low speed serial communication via serial buses.

From the foregoing description it will be appreciated that the invention makes available a novel multiple application switching platform wherein the switch includes at best one shelf having several cards that perform various call processing and switching functions without the use of a centralized matrix.

Having described preferred embodiments of a new and improved multiple application switching platform and method, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A configurable multiple application telephone switch for connecting telephone calls between communication sources and communication destinations wherein said switch includes at least one group of one or more shelves wherein each said shelf includes a backplane for interconnecting said communication sources and said communication destinations, each said backplane having a plurality of backplane slots with each backplane slot associated with a unique identifier, each said group further comprising:

data bus means having a plurality of time slots for transferring telephone call information between said communication sources and said communication destinations;

message bus means for transferring messages that initiate communications between said communication sources and said communication destinations;

a plurality of switching means for interfacing each said communication source and each said communication destination to a corresponding shelf;

management means for selectively assigning various quantities of said time slots to each said switching means based on a desired ratio of time slots per communication sources and communication destinations interfaced by that switching means to control traffic concentration, wherein each said switching means includes:

message means for exchanging said messages that initiate communications between said communication sources and said communication destinations via said message bus means;

time slot selection means for selecting one of said assigned time slots for transferring said telephone call information onto said data bus means in response to said messages; and data transfer means for placing said telephone call information onto said data bus means during said selected assigned time slots to facilitate transference of said telephone call information between said switching means interfacing said communication sources and said switching means interfacing said communication destinations in order to establish connections for said telephone calls;

wherein at least one of said plurality of switching means is disposed on each said shelf; and administration means for receiving and maintaining configuration information including said time slot assignments from said management means and distributing said configuration information to each said switching means via said message bus means.

2. The switch of claim 1 wherein each said group further includes:

power bus means for distributing power signals within each said shelf within a group;

clock generation means for generating clock signals;

clock distribution means for distributing said clock signals from said clock generation means to each said shelf within a group; and power supply means disposed on each said shelf within a group for generating said power signals and transferring said power signals to said power bus means.

3. The switch of claim 1 wherein each said group having a plurality of said shelves further includes:

expander means disposed on each said shelf within each said plural shelf group for interconnecting each said shelf within each said plural shelf group.

4. The switch of claim 6 further including:

data communications means for interfacing external systems to a corresponding group shelf, wherein said management means further includes data assignment means for selectively assigning a portion of said time slots to said data communications means, and said data communications means includes:

message exchange means for exchanging messages that initiate communications between said communication sources and said external systems via said message bus means of said corresponding group;

data time slot selection means for selecting one of said time slots assigned to said data communications means for transferring said telephone call information onto said data bus means of said corresponding group in response to said messages; and data placement means for placing said telephone call information onto said data bus means of said corresponding group during said selected time slot assigned to said data communications means to facilitate transference of said telephone call information between said switching means interfacing said communication sources and said data communications means interfacing said external systems in order to establish a connection and process said telephone calls;

wherein said administration means of said corresponding group further includes configuration means for distributing said configuration information to said data communications means.

5. The switch of claim 1 further including:

a plurality of relay means associated with a group for selectively establishing connections for corresponding switching means of said associated group to process said telephone calls, and replacing said switching means of said associated group in response to said switching means incurring a failure.

6. The switch of claim 1 wherein said switch includes a plurality of groups and each said group includes at least one tandem means for interconnecting each said group.

7. The switch of claim 1 wherein said switch includes a plurality of groups and at least one tandem switch that interconnects each said group, wherein each said group includes at least one tandem means for connecting each said group to said at least one tandem switch.

8. The switch of claim 1 wherein:

each said switching means further includes message access means for enabling access to said message bus means, and data bus access means for enabling access to said data bus means; and said administration means further includes said message access means for enabling access to said message bus means.

9. The switch of claim 8 wherein said data bus means includes at least one data bus with each data bus having at least one data bus portion including a plurality of said time slots for transferring said telephone call information, wherein said management means includes assignment means for selectively assigning said time slots from each said data bus portion to each said switching means to enable transmission of said telephone call information onto each said data bus portion once during each said time slot, and said data bus access means includes data bus interface means for enabling transmission onto each said data bus portion once during each said time slot based on said data bus portion assigned time slots.

10. The switch of claim 8 wherein said message bus means includes at least one message bus, and said message bus access means includes message interface means for enabling transmission of a message from each said shelf within a group in sequential order based on said identifiers to enable transmission of only one message onto each said message bus at any one time.

11. The switch of claim 1 wherein said data bus means includes time division multiplexed data buses, and said message bus means includes high level data link control buses.

12. The switch of claim 1 wherein each said group further includes power bus means for distributing power signals within each said shelf within a group, and each said switching means further includes:

an interface for interfacing said communication sources and said communication destinations;

processing means for controlling processing of said telephone calls, said interface and reception and transmission of said messages; and power means for receiving power signals from said power bus means and converting said power bus signals to particular signals required by said switching means.

13. The switch of 12 wherein each said switching means further includes:

tone means for receiving and interpreting tones from said communication sources and said communication destinations, and converting information to said tones for transmission of said converted information to said communication sources and said communication destinations.

14. The switch of claim 1 wherein each said group further includes power bus means for distributing power signals within each said shelf within a group, and said administration means further includes:

an administration interface for interfacing external systems;

processing means for controlling said administration interface and reception and transmission of said messages;

storage means for maintaining call processing and billing information; and power means for receiving power signals from said power bus means and converting said power signals to particular signals required by said administration means.

15. The switch of claim 4 wherein each said group further includes power bus means for distributing power signals within each said shelf within a group, and said data communications means further includes:

a first interface for interfacing an external host computer;

a second interface for interfacing external signaling systems;

processing means for controlling said first and second interfaces and reception and transmission of said messages; and power means for receiving power signals from said power bus means and converting said power signals to particular signals required by said data communications means.

16. The switch of claim 2 wherein said power supply means includes an inverter for converting input power signals to particular power signals appropriate for distribution to said power bus means.

17. The switch of claim 33 wherein each said group further includes power bus means for distributing power signals within each said shelf within a group and said expander means further includes:

bus repeater means for transferring information between each said shelf within each said plural shelf group; and power means for receiving power signals from said power bus means and converting said power signals to particular signals required by said expander means.

18. The switch of 2 wherein:

said power bus means includes two redundant power buses; and said clock distribution means includes two redundant sets of clock distribution lines.

19. The switch of claim 1 wherein said configuration information further includes monitoring information, and said message bus means includes low speed serial buses for receiving said monitoring information and transferring said monitoring information to said administration means.

20. The switch of claim 8 wherein said data bus means includes at least one data line and an enable line, and said data bus access means includes:

a transmit indicator memory for storing information indicating said time slots assigned for transmitting said telephone call information onto each said data line;

a transmit indicator counter for sequentially addressing said transmit indicator memory during each said time slot;

a receive memory for storing said telephone call information retrieved from each said data line;

a receive memory counter for sequentially addressing said receive memory during each said time slot;

receive means for retrieving said telephone call information from said receive memory for transmission external of said data bus access means;

a transmit memory for storing said telephone call information to be transmitted onto each said data line;

a transmit memory counter for sequentially addressing said transmit memory during each said time slot indicated for transmission by said transmit indicator memory;

transmit means for receiving telephone call information for transmission onto each said data line, and placing said telephone call information into said transmit memory;

a transceiver for placing said telephone call information from each said data line into said receive memory when said transceiver is in a receive state, and placing said telephone call information from said transmit memory onto each said data line when said transceiver is in a transmit state, wherein said transceiver is biased to said receive and transmit states in response to said information within said transmit indicator memory; and toggling means for controlling placement of said telephone call information received from said at least one data line in separate memory areas within said receive memory, and controlling placement of said telephone call information for transmission onto said at least one data line in separate memory areas within said transmit memory.

21. The switch of claim 8 wherein said message bus means includes at least one data line, a hold line, an enable line and a sync line, and said message access means includes:

a counter for cycling through said identifiers, wherein said counter is enabled by said hold line and reset by said sync line;

comparing means for comparing a count from said counter to one of said identifiers;

storage means for storing a request signal indicating that a message is available for transmission onto each said data line;

a receiver/transmitter for receiving a message from each said data line in response to said comparing means indicating said count does not equal said one identifier, and transmitting said available message onto each said data line when said comparing means indicates that said count equals said one identifier and said request signal indicates that said available message is loaded within said receiver/transmitter for transmission onto each said data line;

a data transceiver for retrieving said message from each said data line and placing said message in said receiver/transmitter when said data transceiver is in a receive state, and transmitting said available message from said receiver/transmitter onto each said data line when said data transceiver is in a transmit state wherein said data transceiver is biased to said receive and transmit states in response to said request signal and comparison results of said comparing means;

a hold transceiver for receiving signals from said hold line to enable said counter when said hold transceiver is in a receive state, and placing a hold signal onto said hold line to disable said counter when said hold transceiver is in a transmit state wherein said hold transceiver is biased to said receive and transmit states in response to said request signal and said comparison results of said comparing means; and a driver for placing an enable signal onto said enable line when said receiver/transmitter transmits said available message onto each said data line.

22. The switch of claim 17 wherein each said group further includes clock means for generating and distributing clock signals to each said shelf within a group, said data bus means is disposed on each said shelf and includes at least one data line and an enable line, and said expander means transfers information between each said shelf within each said plural shelf group via vertical buses, said bus repeater means including:

a data line transceiver for transferring said telephone call information from said vertical buses to each said data line when said data line transceiver is in a receive state, and transmitting said telephone call information from each said data line to said vertical buses when said data line transceiver is in a transmit state;

a receiver for receiving enable signals from said enable line enduring for half a cycle of said clock signals; and enable extending means for receiving said half clock enable signals from said receiver and extending said enable signals to a full clock cycle to bias said data transceiver to a transmit state for said full clock cycle.

23. The switch of claim 17 wherein said message bus means is disposed on each said shelf and includes at least one message data line, a message enable line, a hold line and a sync line, wherein said expander means transfers information between each said shelf within each said plural shelf group via vertical buses, and wherein each said group further includes clock means for generating and distributing clock signals to each said shelf within a group, a master counter for cycling through said identifiers wherein said master counter is enabled by said hold line and includes a terminal count output that indicates when said master counter reaches a predetermined final value and a driver for placing said terminal count output onto said sync line to indicate completion of a cycle through said identifiers by said master counter, said bus repeater means including:

a message transceiver for transferring said messages from said vertical buses to each said message data line when said message transceiver is in a receive state, and transferring said messages from each said message data line to said vertical buses when said message transceiver is in a transmit state;

a message receiver for receiving message enable signals from said message enable line enduring for half a cycle of said clock signals; and message enable extending means for receiving said half clock message enable signals from said message receiver and extending said message enable signals to a full clock cycle to bias said message transceiver to a transmit state for said full clock cycle.

24. The switch of claim 1 wherein said message bus means transfers said messages utilizing a High Level Datalink Control (HDLC) protocol.

25. The switch of claim 1 wherein said message bus means transfers said messages utilizing a TCP/IP protocol.

26. The switch of claim 1 further including:

common resource means for processing said telephone calls and generating said communication initiating messages in response to said call processing to enable communications between said communication sources and said communication destinations;

wherein said message bus means transfers said communication initiating messages among said switching means interfacing said communication sources, said switching means interfacing said communication destinations and said common resource means.

27. In a configurable multiple application telephone switch for connecting telephone calls between communication sources and communication destinations wherein said switch includes a data bus having at least one data line, an enable line and a plurality of time slots for transferring telephone call information between said communication sources and said communication destinations, and a plurality of call processing means for establishing connections between said communication sources and said communication destinations to process said telephone calls wherein said call processing means are assigned said plurality of time slots to enable transference of telephone call information onto said data bus, an apparatus for enabling transference of telephone call information onto said data bus during assigned time slots comprising:

a transmit indicator memory for storing information indicating said assigned time slots for transmitting said telephone call information onto each said data line;

a transmit indicator counter for sequentially addressing said transmit indicator memory during each said time slot;

a receive memory for storing said telephone call information retrieved from each said data line;

a receive memory counter for sequentially addressing said receive memory during each said time slot;

receive means for retrieving said telephone call information from said receive memory for transmission external of said apparatus;

a transmit memory for storing said telephone call information to be transmitted onto each said data line;

a transmit memory counter for sequentially addressing said transmit memory during each said assigned time slot indicated for transmission by said transmit indicator memory;

transmit means for receiving telephone call information for transmission onto each said data line and placing said telephone call information into said transmit memory;

a transceiver for placing said telephone call information from each said data line into said receive memory when said transceiver is in a receive state, and placing said telephone call information from said transmit memory onto each said data line when said transceiver is in a transmit state, wherein said transceiver is biased to said receive and transmit states in response to said information within said transmit indicator memory; and toggling means for controlling placement of said telephone call information received from said at least one data line in separate memory areas within said receive memory, and controlling placement of said telephone call information for transmission onto said at least one data line in separate memory areas within said transmit memory.

28. In a configurable multiple application telephone switch for connecting telephone calls between communication sources and communication destinations wherein said switch includes a message bus having at least one data line, a hold line, an enable line and a sync line for transferring messages that initiate communications between said communication sources and said communication destinations, and a plurality of call processing means for establishing connections between said communication sources and said communication destinations wherein each said call processing means is associated with a unique identifier, an apparatus for enabling said call processing means to transfer messages onto said message bus in sequential order comprising:

a counter for cycling through said identifiers, wherein said counter is enabled by said hold line and reset by said sync line;

comparing means for comparing a count from said counter to one of said identifiers;

storage means for storing a request signal indicating that a message is available for transmission onto each said data line;

a receiver/transmitter for receiving a message from each said data line in response to said comparing means indicating said count does not equal said one identifier, and transmitting said available message onto each said data line when said comparing means indicates that said count equals said one identifier and said request signal indicates that said available message is loaded within said receiver/transmitter for transmission onto each said data line;

a data transceiver for retrieving said message from each said data line and placing said message in said receiver/transmitter when said data transceiver is in a receive state, and transmitting said available message from said receiver/transmitter onto each said data line when said data transceiver is in a transmit state wherein said data transceiver is biased to said receive and transmit states in response to said request signal and comparison results of said comparing means;

a hold transceiver for receiving signals from said hold line to enable said counter when said hold transceiver is in a receive state, and placing a hold signal onto said hold line to disable said counter when said hold transceiver is in a transmit state wherein said hold transceiver is biased to said receive and transmit states in response to said request signal and said comparison results of said comparing means; and a driver for placing an enable signal onto said enable line when said receiver/transmitter transmits said available message onto each said data line.

29. In a configurable multiple application telephone switch for connecting telephone calls between communication sources and communication destinations wherein said switch includes at least one group having a plurality of shelves, wherein each said group within said switch includes clock means for generating and distributing clock signals to each said shelf within a group, wherein each said shelf includes a data bus having a plurality of time slots for transferring telephone call information between said communication sources and said communication destinations and a plurality of call processing means for establishing connections between said communication sources and said communication destinations, and wherein said data bus includes at least one data line and an enable line, an apparatus for transferring information between data buses of each said shelf within each said group having a plurality of said shelves via vertical buses comprising:

a data line transceiver for transferring said telephone call information from said vertical buses to each said data line when said data line transceiver is in a receive state, and transmitting said telephone call information from each said data line to said vertical buses when said data line transceiver is in a transmit state;

a receiver for receiving enable signals from said enable line enduring for half a cycle of said clock signals; and enable extending means for receiving said half clock enable signals from said receiver and extending said enable signals to a full clock cycle to bias said data line transceiver to a transmit state for said full clock cycle.

30. In a configurable multiple application telephone switch for connecting telephone calls between communication sources and communication destinations wherein said switch includes at least one group having a plurality of shelves, wherein each said shelf includes a message bus for transferring messages that initiate communications between said communication sources and said communication destinations and a plurality of call processing means for establishing connections between said communication sources and said communication destinations wherein each said call processing means is associated with a unique identifier and said message bus includes at least one message data line, a message enable line, a hold line and a sync line, and wherein each said group within said switch includes clock means for generating and distributing clock signals to each said shelf within a group, a master counter for cycling through said identifiers wherein said master counter is enabled by said hold line and includes a terminal count output that indicates when said master counter reaches a predetermined final value and a driver for placing said terminal count output onto said sync line to indicate completion of a cycle through said identifiers by said master counter, an apparatus for transferring information between message buses of each said shelf within each said group having a plurality of said shelves via vertical buses comprising:

a message transceiver for transferring said messages from said vertical buses to each said message data line when said message transceiver is in a receive state, and transferring said messages from each said message data line to said vertical buses when said message transceiver is in a transmit state;

a message receiver for receiving message enable signals from said message enable line enduring for half a cycle of said clock signals; and message enable extending means for receiving said half clock message enable signals from said message receiver and extending said message enable signals to a full clock cycle to bias said message transceiver to a transmit state for said full clock cycle.

31. In a configurable multiple application telephone switch including at least one group having one or more shelves wherein each said shelf includes a backplane having a plurality of backplane slots with each backplane slot associated with a unique identifier, each said group further including data bus means having a plurality of time slots for transferring telephone call information, message bus means for transferring messages and a plurality of switching means for handling telephone calls, a method of connecting said telephone calls between communication sources and communication destinations comprising the steps of:
  (a) interfacing each said communication source and each said communication destination to a corresponding shelf via said plurality of switching means;
  (b) selectively assigning various quantities of said time slots to each said switching means based on a desired ratio of time slots per communication sources and communication destinations interfaced by that switching means to control traffic concentration, and distributing configuration information including said time slot assignments to each said switching means via said message bus means;
  (c) exchanging messages that initiate communications between said communication sources and said communication destinations via said message bus means; and
  (d) transferring said telephone call information between said switching means interfacing said communication sources and said switching means interfacing said communication destinations in response to said messages, wherein said switching means interfacing said communication sources and said switching means interfacing said communication destinations each select a time slot from among said quantity of time slots assigned to that switching means such that said plurality of switching means transfers said telephone call information during said selected time slots via said data bus means to establish connections for said telephone calls.

32. The method of claim 31 wherein said switch further includes data communications means for interfacing external systems, and step (a) further includes:
  (a.1) interfacing said external systems to a corresponding shelf via said data communications means;
step (b) further includes:
  (b.1) selectively assigning a portion of said time slots to said data communications means, and distributing said configuration information to said data communications means;
step (c) further includes:
  (c.1) exchanging messages that initiate communications between said communication sources and said external systems; and
step (d) further includes:
  (d.1) transferring said telephone call information between said switching means interfacing said communication sources and said data communications means in response to said messages, wherein said switching means interfacing said communication sources and said data communications means each select an assigned time slot and transfer said telephone call information during said selected assigned time slots via said data bus means to establish connections for said telephone calls.

33. The method of claim 31 wherein step (a) further includes:
  (a.1) selectively establishing connections for said plurality of switching means to handle said telephone calls; and
said method further including the step of:
  (e) selectively replacing said switching means in response to said switching means incurring a failure.

34. The method of claim 31 wherein said switch includes a plurality of groups, and step (a) further includes:
  (a.1) interconnecting each said group to increase capacity of said switch.

35. The method of claim 31 wherein said switch includes a plurality of groups and at least one tandem switch, and step (a) further includes:
  (a.1) interconnecting each said group to increase capacity of said switch by connecting each said group to said at least one tandem switch.

36. The method of claim 31 wherein said data bus means includes at least one data bus with each data bus having at least one data bus portion including a plurality of said time slots for transferring said telephone call information, and step (b) further includes:
  (b.1) selectively assigning said time slots from each said data bus portion to each said switching means to enable transmission of said telephone call information onto each said data bus portion once during each said time slot; and
step (d) further includes:
  (d.1) transmitting said telephone call information onto each said data bus portion once during each said time slot based on said data bus portion assigned time slots.

37. The method of claim 31 wherein said message bus means includes at least one message bus, and step (c) further includes:
  (c.1) transmitting a message onto each said message bus from each said shelf within a group in sequential order based on said identifiers to enable transmission of only one message onto each said message bus at any one time.

38. The method of claim 31 wherein said data bus means includes time division multiplexed data buses, and said message bus means includes high level data link control buses, and wherein step (c) further includes:
  (c.1) exchanging said messages that initiate communications between said communication sources and said communication destinations via said high level data link control buses; and
step (d) further includes:
  (d.1) transferring said telephone call information between said switching means interfacing said communication sources and said switching means interfacing said communication destinations via said time division multiplexed data buses.

39. The method of claim 31 wherein said data bus means is disposed on each said shelf, and said method further includes the step of:
  (e) transferring information between said data bus means of each said shelf within each said group having a plurality of said shelves such that each data bus means within a group includes the same information.

40. The method of claim 31 wherein said message bus means is disposed on each said shelf, and said method further includes the step of:
  (e) transferring information between said message bus means of each said shelf within each said group having a plurality of said shelves such that each message bus means within a group includes the same information.

41. The method of claim 31 wherein said configuration information includes monitoring information, said message bus means includes low speed serial buses, and step (c) further includes:
  (c.1) monitoring each said group via said monitoring information placed on each said low speed serial bus.

42. The method of claim 37 wherein step (c.1) further includes:

(c.1.1) incrementing a count corresponding to said identifiers wherein said count cycles through said identifiers to enable each said shelf within a group to transmit a message onto said message bus means;

(c.1.2) comparing said count to one of said identifiers;

(c.1.3) enabling reception of a message from said message bus means when said count does not equal said one identifier;

(c.1.4) enabling transmission of an available message onto said message bus means when said count equals said one identifier; and (c.1.5) preventing said incrementing of said count during transmission of said available message.

43. The method of claim 36 wherein step (d.1) further includes:

(d.1.1) identifying said time slots associated with a particular data bus portion assigned for transmission onto said particular data bus portion;

(d.1.2) enabling reception of said telephone call information from said particular data bus portion during said time slots associated with said particular data bus portion; and (d.1.3) enabling transmission of said telephone call information onto said particular data bus portion during said identified time slots that are assigned for transmission onto said particular data bus portion.

44. The method of claim 31 wherein step (c) further includes:

(c.1) exchanging said messages by utilizing a High Level Datalink Control (HDLC) protocol.

45. The method of claim 31 wherein step (c) further includes:

(c.1) exchanging said messages by utilizing a TCP/IP protocol.

46. The method of claim 31 wherein said switch further includes common resources for processing said telephone calls, and step (c) includes:

(c.1) processing said telephone calls via said common resources and generating said communication initiating messages in response to said call processing to enable communications between said communication sources and said communication destinations; and (c.2) exchanging said communication initiating messages among said switching means interfacing said communication sources, said switching means interfacing said communication destinations and said common resources.

47. In a configurable multiple application telephone switch including data bus means for transferring telephone call information, message bus means for transferring messages and a plurality of switching means for handling telephone calls, wherein each said switching means is associated with a unique identifier, a method of connecting telephone calls between communication sources and communication destinations comprising the steps of:

(a) interfacing said communication sources and said communication destinations via said plurality of switching means to handle said telephone calls;

(b) exchanging messages that initiate communications between said communication sources and said communication destinations via said message bus means, wherein said switch further includes common resources for processing said telephone calls, and step (b) further includes:

(b.1) processing said telephone calls via said common resources and generating said communication initiating messages in response to said call processing to enable communications between said communication sources and said communication destinations; and (b.2) exchanging said communication initiating messages among said switching means interfacing said communication sources, said switching means interfacing said communication destinations and said common resources; and (c) transferring said telephone call information between said switching means interfacing said communication sources and said switching means interfacing said communication destinations via said data bus means, wherein said switching means interfacing said communication sources and said switching means interfacing said communication destinations each select a transmit time from among a various quantity of unique transmit times selectively assigned to that switching means such that said each switching means transfers said telephone call information onto said data bus means during said selected transmit time and receives information during other times in order to establish connections for telephone calls in response to receiving said messages.

48. In a configurable multiple application telephone switch including data bus means for transferring telephone call information, message bus means for transferring messages and a plurality of switching means for handling telephone calls, wherein each said switching means is associated with a unique identifier, a method of connecting telephone calls between communication sources and communication destinations comprising the steps of:

(a) interfacing said communication sources and said communication destinations via said plurality of switching means to handle said telephone calls;

(b) exchanging messages that initiate communications between said communication sources and said communication destinations via said message bus means, wherein step (b) further includes:

(b.1) exchanging said messages that initiate communications between said communication sources and said communication destinations wherein each said switching means transfers a message onto said message bus means in sequential order based on said associated identifier and receives messages from said message bus means when not transferring said message onto said message bus means; and (c) transferring said telephone call information between said switching means interfacing said communication sources and said switching means interfacing said communication destinations via said data bus means, wherein said switching means interfacing said communication sources and said switching means interfacing said communication destinations each select a transmit time from among a various quantity of unique transmit times selectively assigned to that switching means such that said each switching means transfers said telephone call information onto said data bus means during said selected transmit time and receives information during other times in order to establish connections for telephone calls in response to receiving said messages.

* * * * *